United States Patent
Enomura et al.

(10) Patent No.: US 10,611,915 B2
(45) Date of Patent: Apr. 7, 2020

(54) METHOD FOR PRODUCING ORGANIC PIGMENT MICROPARTICLES

(71) Applicant: M. TECHNIQUE CO., LTD., Izumi-shi, Osaka (JP)

(72) Inventors: Masakazu Enomura, Izumi (JP); Kazutaka Takeda, Izumi (JP); Daisuke Honda, Izumi (JP)

(73) Assignee: M. TECHNIQUE CO., LTD., Izumi-Shi, Osaka (JP)

( * ) Notice: Subject to any disclaimer, the term of this patent is extended or adjusted under 35 U.S.C. 154(b) by 0 days.

(21) Appl. No.: 15/751,731

(22) PCT Filed: Sep. 16, 2016

(86) PCT No.: PCT/JP2016/077378
§ 371 (c)(1),
(2) Date: Feb. 9, 2018

(87) PCT Pub. No.: WO2017/047732
PCT Pub. Date: Mar. 23, 2017

(65) Prior Publication Data
US 2018/0230310 A1    Aug. 16, 2018

(30) Foreign Application Priority Data
Sep. 18, 2015    (JP) .................. 2015-185094

(51) Int. Cl.
*C09B 67/08*    (2006.01)
*C09B 67/54*    (2006.01)
(Continued)

(52) U.S. Cl.
CPC ...... *C09B 67/0007* (2013.01); *B01F 7/00758* (2013.01); *C09B 67/0022* (2013.01);
(Continued)

(58) Field of Classification Search
CPC .................................................. C09B 67/0007
(Continued)

(56) References Cited

U.S. PATENT DOCUMENTS

| | | |
|---|---|---|
| 5,482,547 A | 1/1996 | Bugnon et al. |
| 2002/0182413 A1 | 12/2002 | Kunitake et al. |

(Continued)

FOREIGN PATENT DOCUMENTS

| | | |
|---|---|---|
| EP | 1 927 622 A1 | 6/2008 |
| EP | 2383316 A2 | 11/2011 |

(Continued)

OTHER PUBLICATIONS

International Search Report, issued in PCT/JP2016/077378, dated Nov. 1, 2016.
(Continued)

*Primary Examiner* — Tabatha L Penny
(74) *Attorney, Agent, or Firm* — Birch, Stewart, Kolasch & Birch, LLP

(57) ABSTRACT

A method of producing organic pigment microparticles includes: Step 1 of precipitating organic pigment microparticles by mixing an organic pigment raw material liquid in which an organic pigment raw material is mixed with a solvent, and a precipitation solvent for precipitating the organic pigment microparticles from the organic pigment raw material liquid in a thin film fluid formed by introducing the organic pigment raw material liquid and the precipitation solvent in a space between at least two processing surfaces which are disposed so as to face each other, being capable of approaching to and separating from each other, at least one of which rotates relatively to the other; and Step 2 of coating at least a part of the organic pigment microparticles with an oxide coating; wherein the oxide coating is optically (Continued)

colorless and transparent, and Step 1 and Step 2 are performed out continuously in the thin film fluid.

17 Claims, 5 Drawing Sheets

(51) Int. Cl.
 *C09B 67/00* (2006.01)
 *B01F 7/00* (2006.01)
 *B01F 15/02* (2006.01)
(52) U.S. Cl.
 CPC ...... *C09B 67/0023* (2013.01); *C09B 67/0032* (2013.01); *C09B 67/0096* (2013.01); *B01F 2015/0221* (2013.01)
(58) Field of Classification Search
 USPC ...................................................... 427/212
 See application file for complete search history.

(56) References Cited

U.S. PATENT DOCUMENTS

| | | |
|---|---|---|
| 2009/0246674 A1 | 10/2009 | Carlini et al. |
| 2010/0155310 A1 | 6/2010 | Enomura |
| 2012/0006230 A1 | 1/2012 | Enomura |
| 2013/0078467 A1 | 3/2013 | Maekawa et al. |
| 2015/0321154 A1 | 11/2015 | Enomura |

FOREIGN PATENT DOCUMENTS

| | | | |
|---|---|---|---|
| JP | 63-120766 A | | 5/1988 |
| JP | 4-114725 A | | 4/1992 |
| JP | 6-287464 A | | 10/1994 |
| JP | 2001011342 | * | 1/2001 |
| JP | 2002-337100 A | | 11/2002 |
| JP | 2004-244563 A | | 9/2004 |
| JP | 2006-193681 A | | 7/2006 |
| JP | 2008-133319 A | | 6/2008 |
| JP | 2009-82902 A | | 4/2009 |
| jp | 200982902 | * | 4/2009 |
| JP | 2009-221266 A | | 10/2009 |
| jp | 2011057772 | * | 3/2011 |
| JP | 2011-57772 A | | 5/2011 |
| JP | 2011-515567 A | | 5/2011 |
| JP | 5147091 B1 | | 2/2013 |
| WO | WO 2010/100794 A1 | | 9/2010 |
| WO | WO-2010100794 A1 | * | 9/2010 .......... B01F 7/00791 |

OTHER PUBLICATIONS

Extended European Search Report for European Application No. 16846603.5, dated May 27, 2019.

Yuan et al., "Organic Pigment Particles Coated with Titania via Sol-Gel Process," J. Phys. Chem. B, vol. 110, No. 1, 2006 (published on web Dec. 8, 2005), pp. 388-394.

* cited by examiner (a) PR254 microparticles before silicon oxide coating (b) PR254 microparticles after silicon oxide coating in Example 1

(c) PR254 microparticles before silicon oxide coating (after solvent dispersion)

(d) PR254 microparticles after silicon oxide coating in Comparative Example 1

METHOD FOR PRODUCING ORGANIC PIGMENT MICROPARTICLES

TECHNICAL FIELD

The present invention relates to a method of producing organic pigment microparticles.

BACKGROUND ART

Organic pigments are generally more durable than dyes and have higher coloring power than inorganic pigments. Thus, they are widely used as coloring materials for printing inks, paints, toners, color filters and the like, and various manufacturing methods are known.

For example, a manufacturing method in which pulverization treatment is performed in an organic solvent has been proposed, as disclosed in Patent Literature 1. However, by such a method, there are problems that crystallinity of the intended organic pigment microparticles is lowered, a large amount of power is required, inclusion of impurities is inescapable, and high cost is required.

As one of methods for producing organic pigment microparticles which have solved these problems, there is a method of precipitating organic pigment microparticles by mixing an organic pigment solution in which the organic pigment is dissolved in a good solvent capable of dissolving the organic pigment and a poor solvent having a low solubility of the organic pigment, as disclosed in Patent Literature 2. However, there are problems that the organic pigment microparticles prepared by the method as described in Patent Literature 2 often contains an amorphous component, and the pigment particles grow and/or aggregate in a dispersion medium such as water or an organic solvent.

In general, the coloring power is improved by micronizing organic pigments, but at the same time the crystallinity tends to be lowered. In the case where distribution of the particle diameter is wide, the finer the particles are, the more necking tends to occur due to Ostwald ripening. It is difficult to exhibit the expected original characteristics of organic pigment microparticles, such as inherent colors, durability, transmission characteristics and the like.

Therefore, as known from Patent Literature 3, it is conceivable to use a derivative of an organic pigment as a crystal growth inhibitor. However, when a derivative of an organic pigment is used as a crystal growth inhibitor, there is a serious disadvantage that the characteristics of the organic pigment, particularly the inherent colors, change.

Therefore, as known from Patent Literature 4, it is more desirable as a technique for suppressing crystal growth without changing the characteristics of the organic pigment to coat organic pigment microparticles with, for example, an oxide such as silica and the like after precipitation of the organic pigment microparticles.

However, in Patent Literature 4, since it is manufactured in a batch system, step of precipitating organic pigment microparticles and step of coating the precipitated organic pigment microparticles with an oxide are separated. For this reason, there is a disadvantage that a part of the precipitated organic pigment microparticles grows or aggregates before transition to the oxide coating step, and as a result, the coarsened organic pigment microparticles are coated with the oxide. Therefore, it is still difficult to exhibit the expected original characteristics of the organic pigment microparticles.

On the other hand, Patent Literature 5 proposed by the present applicant, discloses that precipitation of organic pigment microparticles and introduction of a modifying group into the precipitated organic pigment microparticles are continuously performed in the thin film fluid between the processing surfaces which are disposed so as to face each other, being capable of approaching to and separating from each other, at least one of which rotates relatively to the other.

However, in Patent Literature 5, there remains a problem that the characteristics of the pigment change due to the chemical reaction by introducing the modifying group. Furthermore, the precipitated organic pigment microparticles are not coated with an oxide, and the organic pigment microparticles produced according to Patent Literature 5 still have a problem of coarsening in the dispersion medium. Therefore, it is required that growth and/or aggregation of particles are suppressed, dispersibility and solvent resistance are improved, and thereby the characteristics such as the inherent colors of the organic pigment microparticles and durability are sufficiently exerted by coating at least a part of the organic pigment microparticles after precipitation of the organic pigment microparticles with an oxide coating prior to growth and/or aggregation.

CITATION LIST

Patent Literature

Patent Literature 1: JP 2004-244563
Patent Literature 2: JP 2006-193681
Patent Literature 3: JP 2009-221266
Patent Literature 4: JP 2011-515567
Patent Literature 5: WO 2010-100794

SUMMARY OF THE INVENTION

Technical Problem

In view of such circumstances, an object of the present invention is to provide a method of producing organic pigment microparticles in which each primary particle of the organic pigment microparticles is individually coated with an oxide. Another object of the present invention is to provide a method of producing organic pigment microparticles which can surely suppress growth of particles.

Solution to the Problem

The present invention provides a method of producing organic pigment microparticles, comprising the following steps: Step 1 of precipitating organic pigment microparticles by mixing an organic pigment raw material liquid in which an organic pigment raw material is mixed with a solvent, and a precipitation solvent for precipitating the organic pigment microparticles from the organic pigment raw material liquid in a thin film fluid formed by introducing the organic pigment raw material liquid and the precipitation solvent in the space between at least two processing surfaces which are disposed so as to face each other, being capable of approaching to and separating from each other, at least one of which rotates relatively to the other; and Step 2 of coating at least a part of the organic pigment microparticles with an oxide coating; wherein the oxide coating is optically colorless and transparent, and Step 1 and Step 2 are performed out continuously in the thin film fluid.

The present invention provides a method of producing organic pigment microparticles, comprising the following steps: Step 1 of precipitating organic pigment microparticles by mixing an organic pigment raw material liquid in which an organic pigment raw material is mixed with a solvent, and a precipitation solvent for precipitating the organic pigment microparticles from the organic pigment raw material liquid in a thin film fluid formed by introducing the organic pigment raw material liquid and the precipitation solvent in the space between at least two processing surfaces which are disposed so as to face each other, being capable of approaching to and separating from each other, at least one of which rotates relatively to the other; and Step 2 of coating at least a part of the organic pigment microparticles with an oxide coating; wherein the oxide coating is optically colorless and transparent, and Step 2 is completed at a predetermined time after Step 1 until the organic pigment microparticles grow and/or aggregate.

The present invention provides a method of producing organic pigment microparticles, comprising the following steps: Step 1 of precipitating organic pigment microparticles by mixing an organic pigment raw material liquid in which an organic pigment raw material is mixed with a solvent, and a precipitation solvent for precipitating the organic pigment microparticles from the organic pigment raw material liquid in a thin film fluid formed by introducing the organic pigment raw material liquid and the precipitation solvent in the space between at least two processing surfaces which are disposed so as to face each other, being capable of approaching to and separating from each other, at least one of which rotates relatively to the other; and Step 2 of coating at least a part of the organic pigment microparticles with an inorganic oxide coating; wherein Step 1 and Step 2 are performed out continuously in the thin film fluid.

The present invention provides a method of producing organic pigment microparticles, comprising the following steps: Step 1 of precipitating organic pigment microparticles by mixing an organic pigment raw material liquid in which an organic pigment raw material is mixed with a solvent, and a precipitation solvent for precipitating the organic pigment microparticles from the organic pigment raw material liquid in a thin film fluid formed by introducing the organic pigment raw material liquid and the precipitation solvent in the space between at least two processing surfaces which are disposed so as to face each other, being capable of approaching to and separating from each other, at least one of which rotates relatively to the other; and Step 2 of coating at least a part of the organic pigment microparticles with an inorganic oxide coating; wherein Step 2 is completed at a predetermined time after Step 1 until the organic pigment microparticles grow and/or aggregate.

The present invention can be performed, wherein the inorganic oxide coating consists of silicon oxide.

The present invention can be performed, wherein the predetermined time is within 1 second.

The present invention can be performed, wherein the primary particle diameter of the organic pigment microparticles obtained by completion of Step 2 is 190% or less relative to the primary particle diameter of the organic pigment microparticles precipitated in Step 1.

The present invention can be performed, wherein in Step 2, the at least a part of the organic pigment microparticles in the thin film fluid is coated with the oxide coating, by introducing an oxide coating raw material and a substance for treating the oxide coating raw material into the thin film fluid, and either of the oxide coating raw material and the substance for treating the oxide coating raw material is introduced into the thin film fluid before or at the same time as precipitation of the organic pigment microparticles.

The present invention can be performed, wherein at least the oxide coating raw material and the precipitation solvent are introduced into the thin film fluid at the same time. The present invention can be performed, wherein at least the substance for treating the oxide coating raw material and the organic pigment raw material liquid are introduced into the thin film fluid at the same time.

The present invention can be performed, wherein in Step 2, the surface of the organic pigment microparticles are coated with a coupling agent interposing between the surface of the organic pigment microparticles and the oxide coating, and the coupling agent is optically colorless and transparent.

The present invention can be performed, wherein in Step 2, the at least a part of the organic pigment microparticles in the thin film fluid is coated with the oxide coating, by introducing the oxide coating raw material, the substance for treating the oxide coating raw material and the coupling agent into the thin film fluid, and the organic pigment raw material liquid and the coupling agent are introduced into the thin film fluid at the same time, or the precipitation solvent and the coupling agent are introduced into the thin film fluid at the same time.

The present invention can be performed, wherein the first fluid, the second fluid and the third fluid are used; the first fluid contains the precipitation solvent and the oxide coating raw material, and the second fluid contains the organic pigment raw material liquid, and the third fluid contains the substance for treating the oxide coating raw material; the coupling agent is included in either of the first fluid and the second fluid; the central side of the at least two processing surfaces is the upstream side and the outside is the downstream side; the first fluid passes between the at least two processing surfaces from the upstream side to the downstream side while forming the thin film fluid; the second fluid passes through the second flow path independent of the first flow path into which the first fluid is introduced into the space between the at least two processing surfaces, and is introduced into the space between the at least two processing surfaces from an opening formed on at least one of the at least two processing surfaces, and the organic pigment raw material liquid and the precipitation solvent are mixed between the at least two processing surfaces to precipitate the organic pigment microparticles, but the precipitation solvent and the oxide coating raw material do not react with each other; the third fluid passes through the third flow path independent of the first flow path and the second flow path, and is introduced into the space between the at least two processing surfaces from an opening formed on at least one of the at least two processing surfaces; the opening of the second flow path is located upstream of the opening of the third flow path; and the thin film fluid containing the precipitated organic pigment microparticles and the third fluid are mixed between the at least two processing surfaces, so that the oxide coating raw material reacts, and at least a part of the organic pigment microparticles in the thin film fluid is coated with the oxide coating.

The present invention can be performed, wherein the first fluid, the second fluid and the third fluid are used; the first fluid contains the precipitation solvent, the second fluid contains the organic pigment raw material liquid and the substance for treating the oxide coating raw material, and the third fluid contains the oxide coating raw material and the coupling agent; the central side of the at least two processing surfaces is the upstream side and the outside is the downstream side; the first fluid passes between the at least two processing surfaces from the upstream side to the downstream side while forming the thin film fluid; the second fluid passes through the second flow path independent of the first flow path into which the first fluid is introduced into the space between the at least two processing surfaces, and is introduced into the space between the at least two processing surfaces from an opening formed on at least one of the at least two processing surfaces, and the organic pigment raw material liquid and the precipitation solvent are mixed between the at least two processing surfaces to precipitate the organic pigment microparticles; the third fluid passes through the third flow path independent of the first flow path and the second flow path, and is introduced into the space between the at least two processing surfaces from an opening formed on at least one of the at least two processing surfaces; the opening of the second flow path is located upstream of the opening of the third flow path; and the thin film fluid containing the precipitated organic pigment microparticles and the third fluid are mixed between the at least two processing surfaces, so that the oxide coating raw material reacts, and at least a part of the organic pigment microparticles in the thin film fluid is coated with the oxide coating.

In the present invention, the reaction field in Step 1 may be acidic or basic, and the reaction field in Step 2 is preferably basic.

The present invention may further comprise a preparation step for homogeneously mixing the substances introduced into the thin film fluid at the same time, and the preparation step may be performed by a stirring machine equipped with stirring blades.

The present invention can be performed, wherein the organic pigment is a diketopyrrolopyrrole, a quinacridone or a phthalocyanine.

Advantageous Effects of the Invention

By using the production method of the present invention, it is possible to coat primary particles of organic pigment microparticles with an oxide without coarsening of the particles by growth and/or aggregation. The organic pigment microparticles obtained by the production method of the present invention have improved solvent resistance and can suppress growth and/or aggregation of the organic pigment microparticles. As a result, the organic pigment microparticles can demonstrate characteristics such as their inherent colors and durability.

Furthermore, since the organic pigment microparticles produced by the production method of the present invention are coated with an oxide coating, their dispersibility is high, a dispersing step and a drying step can be omitted, and the production steps can be simplified in the production process of the organic pigment composition. That is, by producing the organic pigment composition using the organic pigment microparticles produced by the production method of the present invention, cost of the organic pigment composition can be reduced.

DESCRIPTION OF THE INVENTION (Microparticles)

Figure 1:
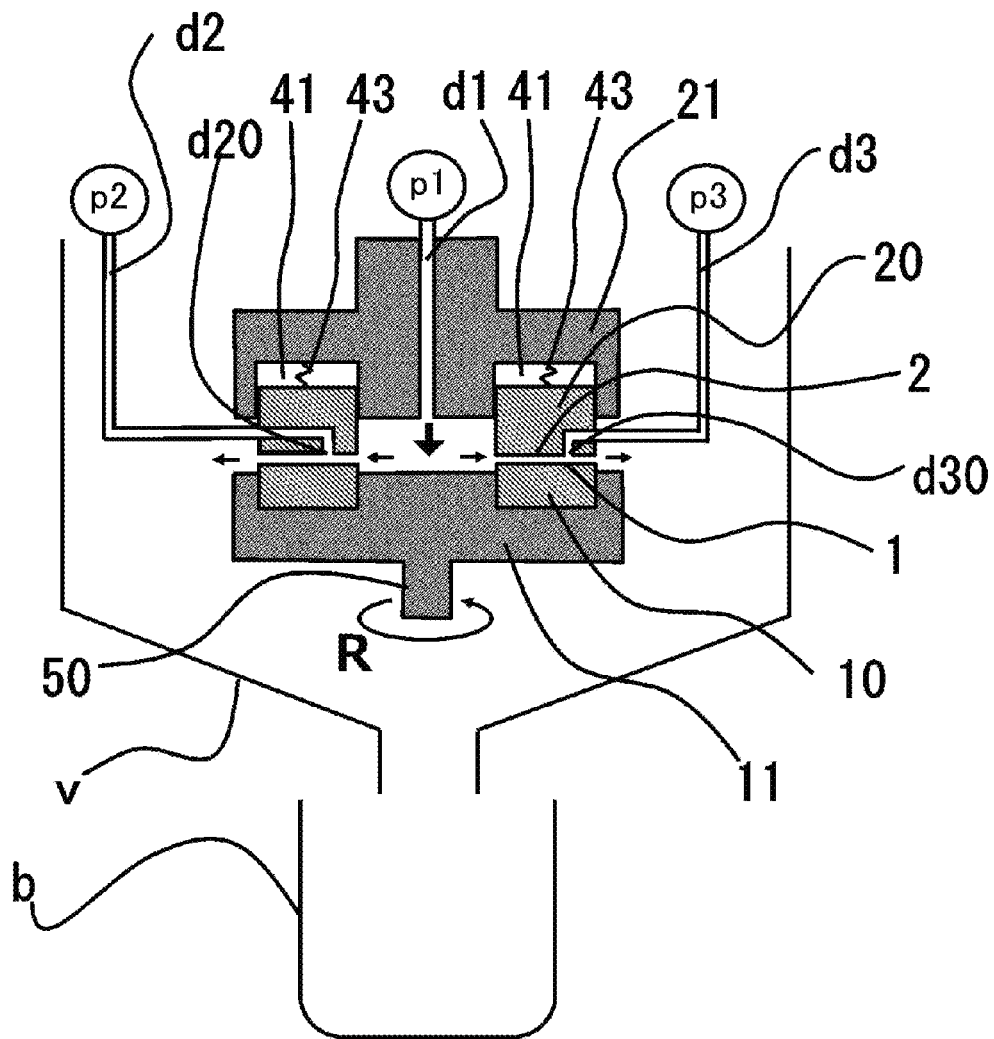
FIG. 1 shows an approximate cross sectional view of a forced thin film microreactor according to the embodiment of the present invention.

In the present invention, microparticles refer to minute particles having a primary particle diameter of 500 nm or less, preferably 100 nm or less, and more preferably 30 nm or less. The shape of the particles or microparticles is not particularly limited, but may be, for example, granular solids in the form such as a substantially cylindrical shape, a substantially spherical shape, a substantially disk shape, a substantially triangular columnar shape, a substantially quadrangular columnar shape, a substantially polyhedral shape, an elliptical shape and the like, or aggregates thereof.

In the present invention, in order to precipitate organic pigment microparticles, a reaction such as a poor solvent method, an acid paste method, an alkali paste method and the like is performed by mixing an organic pigment raw material liquid in which an organic pigment raw material of a raw material of desired organic pigment microparticles is mixed with a solvent, and a precipitation solvent for precipitating the organic pigment microparticles from the organic pigment raw material liquid, in a thin film fluid formed by introducing the organic pigment raw material liquid and the precipitation solvent in the space between at least two processing surfaces which are disposed so as to face each other, being capable of approaching to and separating from each other, at least one of which rotates relatively to the other. This step is referred to as Step 1.

(Organic Pigment)

The organic pigment in the invention is not particularly limited. The examples include the organic pigments registered in The Society of Dyers and Colorists and the like. The production method of the present invention may also be performed using a newly synthesized organic pigment. The above organic pigment may be the same as or different from the organic pigment raw material used as a starting material. For example, the organic pigment raw material may be PR254, and the organic pigment microparticles precipitated by mixing with a precipitation solvent may be PR254 microparticles. The organic pigment raw material used as a starting material may be two or more kinds of organic pigments, and the organic pigment microparticles precipitated by mixing with a precipitation solvent may be microparticles of solid solution of the two or more different organic pigments. These organic pigments may be used alone or in combination of two or more.

(Organic Pigment Raw Material Liquid or Precipitation Solvent)

The solvent for mixing the organic pigment raw material, or the precipitation solvent for precipitating the organic pigment microparticles from the organic pigment raw material liquid by mixing with the organic pigment raw material liquid is not particularly limited, as long as it is a solvent capable of dissolving or molecularly dispersing the organic pigment raw material, or a solvent capable of precipitating the organic pigment microparticles from the organic pigment raw material liquid when mixed with the organic pigment raw material liquid. The precipitation solvent includes, for example, water or an organic solvent, or a mixed solvent consisting of a plurality of these solvents. Water includes tap water, ion-exchanged water, pure water, ultrapure water, RO water and the like. The organic solvent includes an alcohol compound solvent, an amide compound solvent, a ketone compound solvent, an ether compound solvent, an aromatic compound solvent, carbon disulfide, an aliphatic compound solvent, a nitrile compound solvent, a sulfoxide compound solvent, a halogen compound solvent, an ester compound solvent, an ionic liquid, a carboxylic acid compound, and a sulfonic acid compound, and the like. The solvent may be used alone or in combination of two or more thereof.

A basic substance or an acidic substance may be mixed with or dissolved in the organic pigment raw material liquid or the precipitation solvent. The basic substance includes a metal hydroxide such as sodium hydroxide, potassium hydroxide and the like, a metal alkoxide such as sodium methoxide, sodium isopropoxide and the like, a quaternary ammonium hydroxide such as tetrabutylammonium hydroxide and benzyltrimethylammonium hydroxide and the like, an amine compound such as triethylamine, 2-diethylaminoethanol, diethylamine and the like, and the like. The acidic substance includes an inorganic acid such as aqua regia, hydrochloric acid, nitric acid, fuming nitric acid, sulfuric acid, fuming sulfuric acid, and the like, and an organic acid such as formic acid, acetic acid, chloroacetic acid, dichloroacetic acid, oxalic acid, trifluoroacetic acid, trichloroacetic acid and the like. These basic substances or acidic substances may be mixed with various solvents as described above, or each basic substance or acidic substance may be used alone.

(Oxide Coating)

As an oxide coating covering at least a part of the organic pigment microparticles, an optically colorless and transparent one, in other words, one whose transmission characteristics do not substantially affect color characteristics of the organic pigment, are used. Silicon oxide is most preferable from the viewpoint of improvement in dispersibility, transparency and solvent resistance, but in addition, an aluminum oxide such as alumina ($Al_2O_3$) and the like, a zirconium oxide such as zirconia ($ZrO_2$) and the like can also be applied. An organic oxide such as an organopolysiloxane and the like can also be used. In this case, there is an advantage that a coupling agent is unnecessary.

Here, the above mentioned phrase "the transmission characteristics do not substantially affect the color characteristics of the organic pigment", means that change ratio of a chromaticity value in the L*a*b* color specification system of an organic pigment composed of organic pigment microparticles covered with an oxide coating, or an organic pigment composition (eg, ink) prepared using the organic pigment, compared with an organic pigment composed of organic pigment microparticles not covered with an oxide coating, or an organic pigment composition prepared using the organic pigment, is within a predetermined value (for example, 1.5% or less, preferably 1.0% or less, more preferably 0.5% or less). In this case, it is difficult for a human to perceive a color difference. The above phrase means similarly in the RGB colorimetric system, in short, the degree that color difference in organic pigment microparticles themselves or an organic pigment composition cannot be perceived by a human. This definition also applies to a coupling agent described later.

Specifically, the above oxide coating is desirably optically colorless and transparent, equally to or more than an oxide coating formed by the respective substances specifically shown in the later mentioned sections (Oxide Coating Raw Material) and (Coupling Agent).

In this way, by coating at least a part of organic pigment microparticles with an oxide coating, particle growth and/or aggregation of the organic pigment microparticles can be suppressed, durability and dispersibility of the organic pigment microparticles can be improved, and the original characteristics appearing in the organic microparticles (for example, inherent colors, transmission characteristics, or the like) can be maintained.

Further, as the oxide coating covering at least a part of the organic pigment microparticles, it is desirable to use an inorganic oxide such as silicon oxide and the like. Since an inorganic oxide has high solvent resistance, the effect of suppressing particle growth and/or aggregation of the organic pigment microparticles in the dispersion medium, particularly in the organic solvent, is improved by coating at least a part of the organic pigment microparticles with the inorganic oxide. In this case, particle growth and/or aggregation of the organic pigment microparticles can be suppressed while maintaining dispersibility. As a result, it is possible to exert sufficiently the expected original characteristics as the organic pigment microparticles, including color characteristics.

Since the organic pigment microparticles grow and/or aggregate immediately after precipitation in the thin film fluid, it is necessary to carry out quickly Step 2 of coating at least a part of the organic pigment microparticles with an oxide coating in the present invention (hereinafter, also referred to as coating step) in the fluid, desirably in the thin film fluid after precipitation of the organic pigment microparticles.

It is impossible to detect progress of precipitation, growth and/or aggregation of the organic pigment microparticles in the thin film fluid. Therefore, it must be managed by time. Based on the experiments by the inventors, it has been found that when coating with an oxide coating is completed within 1 second after precipitation of the organic pigment, the primary particles of the organic pigment microparticles can be coated with an oxide without coarsening the particles by growth and/or aggregation, and an organic pigment microparticle coated with an oxide can be obtained individually for each primary particle of the organic pigment microparticles. In some cases, further particle growth and/or aggregation may be permitted depending on applications of the organic pigment microparticles. In such case, the organic pigment microparticles may be coated with the oxide coating within a predetermined time exceeding 1 second.

When organic pigment microparticles were precipitated in a batch system as described in the background art, the primary particle diameter of the coated organic pigment microparticles sometimes became larger than 190% in terms of a primary diameter ratio as compared with the microparticles immediately after precipitation, as a result of growth and/or aggregation of the organic pigment microparticles. If the primary particle diameter becomes so large, the desired performance of the organic pigment microparticles cannot be achieved. In the method of the present invention, at least a part of the organic pigment microparticles are coated with a coating before the precipitated organic pigment microparticles grow to coarse particles by growth and/or aggregation in the thin film fluid. Therefore, the primary particle diameter of the coated organic pigment microparticles can be 190% or less of the primary particle diameter of the organic pigment microparticles immediately after precipitation, that is, the primary particle diameter of the organic pigment microparticles not coated with an oxide. And it is possible to exert sufficiently the expected original characteristics as the organic pigment microparticles.

In the present embodiment, the oxide coating raw material and the substance for treating the oxide coating raw material are introduced into the thin film fluid, whereby the organic pigment microparticles in the thin film fluid are coated with the oxide coating. It is desirable to introduce either of the oxide coating raw material and the substance for treating the oxide coating raw material into the thin film fluid before or at the same time as the organic pigment microparticles are precipitated. It is more desirable to introduce at least the oxide coating raw material and the precipitation solvent into the thin film fluid at the same time, or to introduce at least the substance for treating the oxide coating raw material and the organic pigment raw material liquid into the thin film fluid at the same time.

When either of the oxide coating raw material and the substance for treating the oxide coating raw material is introduced into the thin film fluid before or at the same time as the organic pigment microparticles are precipitated, an oxide coating is formed on at least a part of organic pigment microparticles, only by introducing the other of the oxide coating raw material or the substance for treating the oxide coating raw material into the thin film fluid. Thereby, the time from precipitation of the organic pigment microparticles until formation of the coating can be shortened. This contributes to suppress particle growth and/or aggregation of the organic pigment microparticles after precipitation.

Further, the oxide coating does not necessarily coat the entire organic pigment microparticles. It has been experimentally found that even coating of only a part of the particles contributes to suppress particle growth and/or aggregation of the organic pigment microparticles.

(Oxide Coating Raw Material)

When silicon oxide is used as the oxide coating, examples of the oxide coating raw materials include an inorganic silicon compound such as a silicon oxide, hydroxide, chloride, salt and the like, or a hydrate thereof, and an organic silicon compound such as a silicon alkoxide, acetylacetonate compound and the like, or a hydrate thereof. Not particularly limited, examples thereof include phenyltrimethoxysilane, methyltrimethoxysilane, methyltriethoxysilane, 3-glycidoxypropyltrimethoxysilane, 3-trifluoropropyl-trimethoxysilane, methacryloxypropyltriethoxysilane, tetramethoxysilane (TMOS), tetraethoxysilane (TEOS), and an oligomeric condensate of TEOS, for example, ethyl silicate 40, tetraisopropylsilane, tetrapropoxysilane, tetraisobutoxysilane, tetrabutoxysilane, and a similar material thereof. Further, another siloxane compound, bis(triethoxysilyl)methane, 1,9-bis(triethoxysilyl)nonane, diethoxydichlorosilane, triethoxychlorosilane and the like may be used.

When alumina is used as the oxide coating, examples of raw materials thereof include an inorganic aluminum oxide compound such as aluminum oxide, hydroxide, chloride, salt and the like, or a hydrate thereof, and an organic aluminum oxide compound such as an aluminum alkoxide, acetylacetonate compound and the like, or a hydrate thereof. Not particularly limited, examples thereof include an aluminum compound such as aluminum hydroxide, aluminum isopropoxide, aluminum butoxide and the like. When zirconia is used as the oxide coating, examples of raw materials thereof include an inorganic zirconium compound such as zirconium oxide, hydroxide, chloride, salt and the like, or a hydrate thereof, and an organic zirconium compound such as a zirconium alkoxide, acetylacetonate compound and the like, or a hydrate thereof. Not particularly limited, examples thereof include a zirconium compound such as zirconium isopropoxide, zirconium butoxide and the like.

(Substance for Treating Oxide Coating Raw Material)

The substance for treating the oxide coating raw material is a substance used for adjusting liquid property of the reaction field to be basic, when preparing the oxide coating by reacting the oxide coating raw material. When silicon oxide is used as an oxide coating, a basic substance is used as a substance for precipitating silicon oxide. The basic substance is not particularly limited, but includes a metal hydroxide such as sodium hydroxide, potassium hydroxide and the like, a metal carbonate such as sodium carbonate, potassium carbonate and the like, an amine compound such as triethylamine, 2-diethylaminoethanol, diethylamine and the like, and ammonia. A quaternary ammonium hydroxide such as tetrabutylammonium hydroxide, benzyltrimethylammonium hydroxide and the like may be also used.

In Step 2, organic pigment microparticles at least a part of which is coated with an oxide coating can be prepared by reacting an oxide coating raw material by a sol-gel method under a basic condition. More specifically, in Step 2, the oxide coating raw material can be hydrolyzed, and dehydrated and polycondensed under a basic condition to prepare the organic pigment microparticles at least a part of which is coated with an oxide coating.

Step 1 is performed under an environment in which the above hydrolysis reaction and the dehydration polycondensation reaction do not proceed. In Step 1, the oxide coating raw material does not react, even if the oxide coating raw material is introduced into the thin film fluid before or at the same time as the organic pigment microparticles are precipitated.

The reaction field of Step 1 may be acidic or basic. When the oxide coating raw material or a coupling agent described later is introduced into the thin film fluid before or at the same time as the organic pigment microparticles are precipitated, the reaction field in Step 1 is preferably acidic, more preferably weakly acidic. When the substance for treating the oxide coating raw material is introduced into the thin film fluid before or at the same time as the organic pigment microparticles are precipitated, the reaction field in Step 1 is preferably basic.

(Coupling Agent)

In the case that the oxide coating is an inorganic oxide, an optically colorless and transparent coupling agent may be interposed between the surface of the organic pigment microparticles and the oxide coating. It is preferable to interpose a coupling agent between the two materials in order to improve affinity of both materials.

When a silicon oxide is used as the oxide coating, a silane coupling agent is used as the coupling agent. The silane coupling agent is not particularly limited as long as it has two or more different reactive groups in the molecule. Examples of the silane coupling agents include 3-aminopropyltriethoxysilane, 3-(2-aminoethylamino)propyltrimethoxysilane, 3-(2-aminoethylamino)propyldimethoxymethylsilane, 3-(2-aminoethylamino)propyltriethoxysilane, 3-aminopropyldimethoxymethylsilane, bis[3-(trimethoxysilyl)propyl]amine, 3-aminopropyldiethoxymethylsilane, [3-(N,N-dimethylamino)propyl]trimethoxysilane, 3-aminopropyltrimethoxysilane, trimethoxy[3-(methylamino)propyl]silane and the like. A coupling agent which does not substantially adversely affect the characteristics of the organic pigment microparticles is desirable.

When aluminum oxide is used as the oxide coating, acetoalkoxyaluminum diisopropylate, aluminum acetylacetonate or the like can be used as the coupling agent. When zirconium oxide is used as the oxide coating, zirconium acetylacetonate, zirconium stearate or the like can be used as the coupling agent.

(Regarding Reaction of Silane Coupling Agent)

Bonding between the coupling agent and the organic pigment microparticles is not limited to those derived from affinity of lipophilic groups, but a direct bond may be formed by reacting the organic pigment microparticles and the coupling agent. The reaction does not affect the color characteristics of the pigment. Further, hydrolysis of the coupling agent itself and condensation polymerization reaction between the coupling agents may proceed. Bonding between the coupling agent and the organic pigment microparticles may be performed in either Step 1 or Step 2.

The coupling agent and the oxide coating are bonded by dehydration polycondensation by the sol-gel method. Further, hydrolysis of the coupling agent itself and condensation polymerization reaction between the coupling agents may proceed. Bonding between the coupling agent and the oxide coating is performed in Step 2.

In the present embodiment, the coupling agent is introduced into the thin film fluid in addition to the oxide coating raw material and the substance for treating the oxide coating raw material, whereby the oxide coating is interposed between the surface of the organic pigment microparticles and the oxide coating in the thin film fluid. However, it is desirable that the coupling agent is introduced into the thin film fluid before or at the same time as the organic pigment microparticles are precipitated. It is more desirable that the coupling agent and the organic pigment raw material liquid are introduced into the thin film fluid at the same time, or that the coupling agent and the precipitation solvent are introduced into the thin film fluid at the same time.

(Dispersing Agent, Etc.)

A dispersing agent such as a block copolymer, a high molecular weight polymer, a surfactant or the like may be included in the organic pigment raw material liquid, the precipitation solvent, the oxide coating raw material, the substance for treating the oxide coating raw material and the coupling agent in the present invention, as long as it does not adversely affect the characteristics of the organic pigment microparticles.

(Reaction Apparatus)

In the present invention, a forced thin film microreactor is preferably used in the steps of precipitating organic pigment microparticles and coating the microparticles with an optically colorless transparent oxide coating, that is, Step 1 and Step 2. Among microreactors, the same forced thin film microreactor as the apparatus described in Patent Literature 5, shown in FIG. 1 is preferably used. The forced thin film microreactor is explained in detail hereinafter.

The forced thin film microreactor in the present embodiment (hereinafter also referred to as a fluid processing apparatus) includes the first and second processing units 10 and 20 facing each other, and the first processing unit 10 rotates. The facing surfaces of the processing units 10 and 20 are respectively the processing surfaces. The first processing unit 10 has the first processing surface 1, and the second processing unit 20 has the second processing surface 2.

Both processing surfaces 1 and 2 are connected to the flow paths d1, d2 and d3 of the first, second and third fluids to be processed, and constitute a part of the sealed flow path of the fluid to be processed. The distance between the processing surfaces 1 and 2 is usually adjusted to a minute interval of 1 mm or less, for example, about 0.1 to 50 µm. As a result, the fluid to be processed passing between the processing surfaces 1 and 2 becomes a forced thin film fluid forced by the processing surfaces 1 and 2.

This apparatus performs fluid processing between the processing surfaces 1 and 2 to react the first, second or third fluids to be processed and to precipitate organic pigment microparticles.

More specifically, the apparatus comprises the first holder 11 holding the first processing unit 10, the second holder 21 holding the second processing unit 20, the surface approaching pressuring mechanism 43, the rotation drive mechanism (not shown in drawing), the first introduction part d1, the second introduction part d2, the third introduction part d3, and the fluid pressuring mechanisms p1, p2 and p3. As the fluid pressuring mechanisms p1, p2 and p3, a compressor or other pumps may be used. A thermometer and a pressure gauge are provided in each of the first introduction part d1, the second introduction part d2 and the third introduction part d3, and the introduction pressure of the first, second and third fluids to be processed and the temperature under the introduction pressure can be measured.

The opening of the third introduction part d3 on the second processing surface 2 is located outside the opening of the second introduction part d2 from the rotation center of the first processing surface 1. Namely, on the second processing surface 2, the opening of the third introduction portion d3 is located downstream of the opening of the second introduction portion d2. A gap is formed between the opening of the third introduction part d3 and the opening of the second introduction part d2 in the inner and outer diameter direction of the second processing member 20.

In the above embodiment, the first processing unit 10 and the second processing unit 20 are ring shape disks. As a material of the first and second processing units 10 and 20, metal, carbon, ceramic, sintered metal, abrasion resistant steel, sapphire, hardened metal, and hard material treated with lining, coating, plating or the like may be used. In the above embodiment, the first and second opposing processing surfaces 1 and 2 in the first and second processing units 10 and 20 are mirror polished, and the arithmetic mean roughness is 0.01 to 1.0 µm.

In the above embodiment, the second holder 21 is fixed to the machine, and the first holder 11 rotates which is attached to a rotating shaft 50 of the rotation drive mechanism similarly fixed to the machine, and the first processing unit 10 supported on the first holder 11 rotates relative to the second processing unit 20. Of course, the second processing unit 20 may rotate instead, or both may rotate. Further, in the present invention, the above rotation speed may be, for example, 350 to 5,000 rpm.

In the above embodiment, the second processing unit 20 approaches to and separates from the first processing unit 10 in the direction of the rotation shaft 50, and the part opposite to the processing surface 2 side of the second processing unit 20 is retractably housed in the housing portion 41 provided in the second holder 21. However, on the contrary, the first processing unit 10 may approach to and separate from the second processing unit 20, or both processing units 10 and 20 may approach to and separate from each other.

The housing portion 41 is a concavity housing the part opposite to the processing surface 2 side of the second processing unit 20, and is a groove formed in a ring shape. The housing portion 41 houses the second processing unit 20, with sufficient clearance that the part opposite to the processing surface 2 side of the second processing unit 20 can appear and disappear.

The surface approaching pressuring mechanism is a mechanism for generating a pushing force in the direction of approximating the first processing surface 1 of the first processing unit 10 and the second processing surface 2 of the second processing unit 20 (hereinafter, referred to as surface approaching pressure). By a balance between this surface approaching pressure and the force of separating both processing surfaces 1 and 2 by the fluid pressure of the organic pigment raw material liquid and the precipitation solvent (hereinafter, referred to as separation force), the interval between both processing surfaces 1 and 2 is maintained minute, to generate a thin film fluid with a minute film thickness of nm unit to μm unit. In the above embodiment, the surface approaching pressuring mechanism gives a surface approaching pressure with a spring 43 provided in the second holder 21 by energizing the second processing unit 20 toward the first processing unit 10.

Further, pressure of a fluid for back pressure such as air may be applied in addition to the spring 43. The sum of all these pressures is the above surface approaching pressure, and this surface approaching pressure is balanced with the separation force due to the fluid pressure of the organic pigment raw material liquid and the precipitation solvent. In the case that each fluid to be processed is introduced and mixed in the space between the processing surfaces at a temperature of its boiling point or higher, it is preferable to set the fluid pressure of the organic pigment raw material liquid and the precipitation solvent high. Specifically, the fluid pressure of the organic pigment raw material liquid and the precipitation solvent exceeds the standard pressure, and the surface approaching pressure is also set high to be balanced with the fluid pressure. Specifically, the pressure of the fluid for back pressure may be set to 0.020 to 0.350 MPaG, preferably 0.050 to 0.400 MPaG, more preferably 0.100 to 0.500 MPaG, and the pressure of the spring 43 may be set to 0.007 to 0.030 MPa, preferably 0.010 to 0.200 MPa.

The first fluid to be processed which is pressurized by the surface approaching pressuring mechanism p1 is introduced into the space between the processing units 10 and 20 from the first introduction part d1. On the other hand, the second fluid to be processed which is pressurized by the surface approaching pressuring mechanism p2 is introduced into the space between the processing units 10 and 20 from the opening d20 formed on the second processing surface through a passage provided from the second introduction part d2 in the interior of the second processing unit 20.

In the opening d20, the first fluid to be processed and the second fluid to be processed are merged and mixed. At that time, the mixed fluids to be processed become a thin film fluid forced by the processing surfaces 1 and 2 to maintain the above minute interval, and are forced to move outside of the ring shape of both processing surfaces 1 and 2. Since the first processing unit 10 rotates, the mixed fluids to be processed do not move linearly from the inside of the ring shape of both processing surfaces 1 and 2 to the outside, but move in a substantially spiral shape from the inside to the outside by the combination vector of the mobile vector in the radial direction and the mobile vector in the circumferential direction acting on the fluid to be processed.

Figure 2:
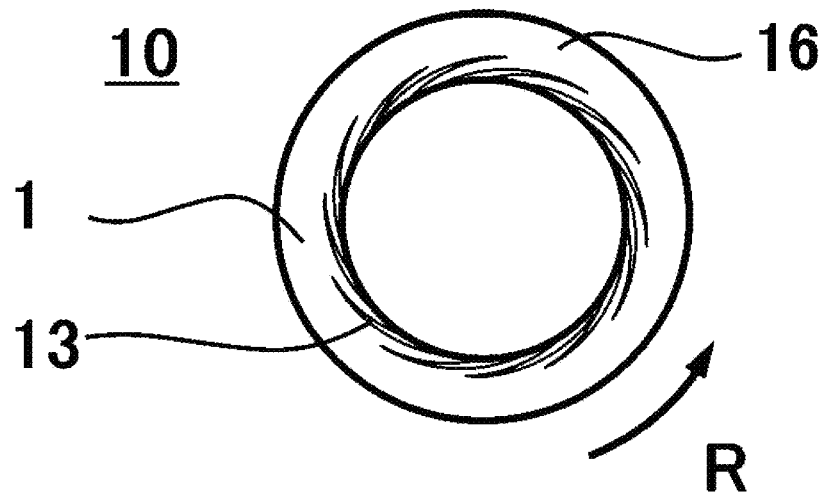
FIG. 2 shows a schematic plan view of the first processing surface of the forced thin film microreactor of FIG. 1.

Here, as shown in FIG. 2, a groove like concavity 13 may be formed on the first processing surface 1 of the first processing unit 10, which extends from the center side of the first processing unit 10 to the outside, or in the radial direction. The planar shape of the concavity 13 may be one extending curvingly or spirally on the first processing surface 1, and although not shown, one extending straight outward, one bending or curving in an L shape or the like, continuous one, intermittent one, one having branches. Further, the concavity 13 formed on the second processing surface 2 may be performed, and also the concavity 13 formed on both the first and second processing surfaces 1 and 2 may be performed. Formation of such concavity 13 may give a micropump effect, and also an effect to transfer the fluids to be processed between the first and second processing surfaces 1 and 2.

The base end of the concavity 13 desirably reaches the inner periphery of the first processing unit 10. The tip end of the concavity 13 extends towards the outer peripheral surface of the first processing surface 1, and the depth gradually decreases from the base end to the tip end. A flat surface 16 without concavity 13 is provided between the tip end of the concavity 13 and the outer peripheral surface of the first processing surface 1.

The above opening d20 is preferably provided at a position facing the flat surface of the first processing surface 1. In particular, the opening d20 is preferably provided at a position facing the flat surface 16, which is a downstream side from the position where the flow direction of the fluids to be processed as introduced is converted into the flow direction of the spiral laminar flow formed between both processing surfaces by the micropump effect. Thereby, it is possible to mix a plurality of fluids to be processed at a laminar flow condition, and to precipitate microparticles.

It is preferred to provide directionality to the second introduction part d2. For example, the introduction direction from the opening d20 of the second processing surface 2 may be inclined at a predetermined elevation angle relative to the second processing surface 2. The introduction direction from the opening d20 of the second processing surface 2 may have directionality on the plane along the above second processing surface 2, and the introduction direction of the second fluid to be processed may be the radially outward direction from the center in the radial direction component, and the forward direction in the rotation direction component of the fluids between the rotating processing surfaces. Thus, the flow of the first fluid to be processed at the opening d20 is a laminar flow, and the second introduction part d2 has directionality, and thereby the second fluid to be processed can be introduced into the space between the processing surfaces 1 and 2 while suppressing occurrence of turbulence against the first fluid to be processed.

Further, as shown in FIG. 1, the third fluid to be processed which is pressurized by the fluid pressuring mechanism p3 is introduced from the opening d30 formed on the second processing surface into the space between the processing units 10 and 20 through a passage provided from the third introduction part d3 to the inside of the second processing unit 20.

Since the opening d30 is provided on the downstream side of the opening d10 and the opening d20, the third fluid to be processed is merged and mixed with the mixed fluid of the first fluid to be processed and the second fluid to be processed at the opening d30.

As in the case where the first fluid to be processed and the second fluid to be processed are merged and mixed, the mixed fluid to be processed become a thin film fluid forced by the processing surfaces 1 and 2 to maintain the above minute interval, and are forced to move in a substantially spiral shape from the inside to the outside of both processing surfaces 1 and 2.

The micropump effect by provision of the opening d30 at a position facing the flat surface of the first processing surface 1; the point that the opening d30 is preferably provided at a position facing the flat surface 16, which is a downstream side from the position where the flow direction of the mixed fluid of the first fluid to be processed and the second fluid to be processed is converted into the flow direction of the spiral laminar flow formed between both processing surfaces; and further point that it is preferable to provide directionality to the third introduction part d3, are the same as in the case of the opening d20.

The mixed fluid to be processed which is discharged outside both processing units 10 and 20 is collected in the beaker b as a discharged liquid through the vessel v.

As described above, in the reaction apparatus according to this embodiment, the region between the opening d20 and the opening d30 in the region between the processing surfaces 1 and 2 is the region for precipitation and formation of the organic pigment microparticles in Step 1. The region downstream of the opening d30 (outside in FIG. 1) in the region between the processing surfaces 1 and 2 is the region for precipitation of the oxide to be the coating in Step 2. However, since Step 1 and Step 2 are performed continuously, both steps may not be completely separated. In other words, even after step 2 has started, precipitation, growth and/or aggregation of the organic pigment microparticles may partially continue.

Kinds of the above fluids to be processed and number of the flow paths are three in the example of FIG. 1, but may be four or more. Shape, size and number of the openings for the introduction provided in respective processing units, may be changed and carried out appropriately without any particular restriction. For example, as shown in FIG. 1, shape of the openings d20 and d30 may be a concentric circular ring shape surrounding the central opening of the processing surface 2 which is a ring shape disc, and the ring shape opening may be continuous or discontinuous.

In Examples 1 to 7 described later, the organic pigment raw material liquid, the precipitation solvent, the oxide coating raw material, the substance for treating the oxide coating raw material and the coupling agent are introduced in the space between the processing surfaces, using three consecutive ring shape openings of d10, d20 and d30. However, respective openings may be provided for each fluid (five kinds of fluids of the organic pigment raw material liquid, the precipitation solvent, the oxide coating raw material, the substance for treating the oxide coating raw material, and the coupling agent).

In addition, an introduction opening may be provided on the upstream side of the first and second processing surfaces 1 and 2. In the present embodiment, the openings d30 preferably open continuously in a ring shape, and more preferably the openings d20 and d30 open continuously in a ring shape. Since the openings d30 or the openings d20 and d30 have a ring shape, all of the first to third fluids to be processed can surely be contacted with each other between the processing surfaces 1 and 2. Thereby, the organic pigment microparticles at least a part of which is coated with an oxide coating can be reliably produced.

In order to introduce the above five kinds of fluids using three openings d10, d20 and d30 as in the present embodiment described later, a plurality of fluids among the above five types of fluids must be introduced through one opening. As a result, as described above, it is possible to reduce the number of openings, and to shorten the time from precipitation of the organic pigment microparticles until formation of the coating, and furthermore, to save the trouble of managing the introduction flow rate and pressure of each opening. In introducing the plurality of fluids from one opening, it is desirable to simultaneously introduce them in order to make the precipitation reaction uniform. Further, it is desirable to provide a preparation step for homogeneously mixing the substances introduced simultaneously into the thin film fluid. For more homogeneous mixing, it is more desirable to prepare by a stirrer equipped with stirring blades described later.

The apparatus provided with the above three openings (d10, d20 and d30) is suitable for the case where Step 1 and Step 2 are performed between the continuous processing faces.

However, when practicing the present invention, it is also possible to perform one of Step 1 and Step 2 between the above processing surfaces and to perform the other step using a different apparatus. In this case, it is sufficient to provide at least two openings (d10, d20) in the apparatus having the above processing surface, but practicing the present invention by an apparatus having three or more openings is prevented.

In the present invention, it is preferable to introduce three fluids of the first fluid, the second fluid and the third fluid respectively from the first, second and third openings (d10, d20 and d30) into the space between the processing surfaces 1 and 2 for practicing the present invention in the fluid processing apparatus.

First, the first fluid is introduced from the first introduction part into the space between the processing surfaces 1 and 2, and the second fluid is introduced from the second introduction part into the space between the processing surfaces 1 and 2, and both fluids are mixed in the thin film fluid formed between the processing surfaces, whereby the organic pigment microparticles are precipitated in the mixed fluid of both fluids. Next, the third fluid is introduced from the third introduction part into the space between the processing surfaces 1 and 2, and the mixed fluid containing the precipitated organic pigment microparticles and the third fluid are mixed in the thin film fluid formed between the processing surfaces to precipitate the oxide to be a coating on at least a part of the organic pigment microparticles so that the organic pigment microparticles coated with the oxide can be produced. Namely, after the organic pigment microparticles are precipitated between the processing surfaces 1 and 2 by using the fluid processing apparatus, by introducing the third fluid into the space between the processing surfaces 1 and 2 prior to discharging the mixed fluid of the first fluid and the second fluid containing the organic pigment microparticles from the space between the processing surfaces 1 and 2, the mixed fluid of the first fluid and the second fluid containing the organic pigment microparticles and the third fluid are mixed between the processing surfaces 1 and 2 to precipitate the oxide to be a coating on at least a part of the organic pigment microparticles so that the organic pigment microparticles coated with the oxide can be produced.

By the method as described above, Step 1 and Step 2 can be performed continuously.

The organic pigment microparticles may be precipitated by mixing the first fluid and the second fluid in the thin film fluid, so that one of the organic pigment raw material liquid and the precipitation solvent may be contained in the first fluid, and the other one may be contained in the second fluid.

One of the oxide coating raw material and the substance for treating the oxide coating raw material may be contained in the first fluid or the second fluid, and the other one may be contained in the third fluid. In the case where the coupling agent is interposed between the surface of the organic pigment microparticles and the oxide coating, the coupling agent may be contained in any one of the first, second, and third fluids.

In particular, performing by a combination in which the first fluid includes the precipitation solvent and the oxide coating raw material, the second fluid includes the organic pigment raw material liquid, the third fluid includes the oxide coating raw material, and the coupling agent is included in either the first fluid or the second fluid; or another combination in which the first fluid includes the precipitation solvent, the second fluid includes the organic pigment raw material liquid and the substance for treating the oxide coating raw material, the third fluid includes the oxide coating raw material and the coupling agent, enables precipitation of the pigment microparticles and formation of the oxide coating respectively at preferable pH values. When a basic substance is used for dissolving the organic pigment raw material as described in Examples 1 to 4 below of the present application, Step 1 is performed preferably under an acidic condition, and Step 2 is required to be performed under a basic condition. However, as in Example 5 below of the present application, even when a basic substance is used for dissolving the organic pigment raw material, both Steps 1 and 2 may be performed under a basic condition, and the liquid property is not particularly limited.

It is necessary to complete mixing the mixed fluid containing the organic pigment microparticles obtained by mixing the first and second fluids and the third fluid, and coating at least a part of the organic pigment microparticles with the oxide coating, before growth and/or aggregation of the organic pigment microparticles. Namely, it is necessary to complete Step 2 after above Step 1 before growth and/or aggregation of the organic pigment microparticles. Therefore, the time from mixing of the first and second fluids until completion of coating with the oxide caused by precipitation of the organic pigment microparticles and subsequent mixing with the third fluid is preferably within 1 second. Thereby, it is preferable that the third fluid is continuously mixed following the mixing of the first fluid and the second fluid. Not particularly limited, the third fluid is mixed preferably within 0.5 seconds, more preferably within 0.3 seconds after mixing the first and second fluids.

(Preparation Apparatus)

For preparation of various solutions or solvents in the present invention, it is desirable to use a machine to achieve homogeneous mixing by adding a shearing force or the like to the fluid, for example, a machine to rotate a stirrer of various shapes including rod like, plate like and propeller like shapes in a tank, a machine equipped with a screen which rotates relative to a stirrer, or the like. As a preferable example of a high speed rotary dispersion emulsification machine, the stirring machine disclosed in JP 5147091 can be applied.

Further, the rotary dispersing machine may be a batch type machine or a continuous type machine. When carried out in continuous mode, the continuous type machine may be a machine in which fluids are continuously supplied to and discharged from a stirring tank, or a machine using a continuous mixer without using a stirring tank, or a machine controlling mixing energy appropriately using a known stirrer or stirring means.

The stirring energy is explained in detail in JP H04-114725 filed by the present applicant. Stirring methods in the present invention are not particularly limited, and various stirring machines such as a shearing type machine, a friction type machine, a high pressure jet type machine, an ultrasonic machine, and a dissolver, an emulsifier, a dispersing machine, a homogenizer and the like can be used in the present invention. Examples of the rotary dispersing machine include continuous emulsification machines such as Ultra-Turrax (IKA Works, Inc.), Polytron (Kinematica AG), TK Homomixer (Primix Corporation), Ebara Milder (Ebara Corporation), TK Homomic Line Flow (Primix Corporation), Colloid Mill (Shinko-Pantech Co., Ltd.), Thrasher (Nippon Coke & Engineering Co., Ltd.), Trigonal Wet Type Micropulverizer (Mitsui Miike Machinery Co., Ltd.), Cavitron (Eurotech, Ltd.), Fineflow Mill (Pacific Machinery & Engineering Co., Ltd.) and the like; and batch type or dual type emulsification machines such as CLEARMIX (M technique Co., Ltd.), CLEARMIX Dissolver (M technique Co., Ltd.), Filmix (Primix Corporation) and the like.

Particularly, it is desirable that the stirring treatment is performed using a stirring machine equipped with high speed rotating stirring blades, and a screen on the outside of the stirring blades, which discharges fluids as an jet flow from the opening of the screen, especially above mentioned CLEARMIX (M Technique Co., Ltd.) and CLEARMIX Dissolver (M Technique Co., Ltd.).

EXAMPLE

Hereinafter, the present invention is explained in more detail with reference to examples. However, the present invention is not limited to the following examples. In the following examples, the first fluid (hereinafter, also referred to as liquid A) refers to the first fluid to be processed which is introduced from the first introduction part d1 of the apparatus shown in FIG. 1, and similarly, the second fluid (hereinafter, also referred to as liquid B) refers to the second fluid to be processed which is introduced from the second introduction part d2 of the apparatus. The third fluid (hereinafter, also referred to as liquid C) refers similarly to the third fluid to be processed which is introduced from the third introduction part d3 of the apparatus.

Examples 1 to 4: Silicon Oxide Coated PR254 Microparticles

Examples 1 to 4 show examples in which PR254 microparticles of an organic pigment of a diketopyrrolopyrrole were coated with silicon oxide. The first fluid and the second fluid were prepared using CLEARMIX (product name: CLM-0.8 S, M. Technique Co., Ltd.). Specifically, based on the formulation of liquid A shown in Examples 1 to 4 of Table 1, respective raw materials were weighed, and mixed homogeneously by stirring using CLEARMIX at preparation temperature of 25° C. and at the rotor rotational speed of 10,000 rpm for 30 min to prepare liquid A. Based on the formulation of liquid B shown in Examples 1 to 4 of Table 1, respective raw materials were weighed, and mixed homogeneously by stirring using CLEARMIX at preparation temperature of 40° C. and at the rotor rotational speed of 20,000 rpm for 30 min to prepare liquid B.

For the substances listed in Table 1, acetic acid is acetic acid (99.7%, Kanto Chemical Co., Inc.), TEOS is tetraethyl orthosilicate (Wako Pure Chemical Industries, Ltd.), PR254 is Irgazin Red L3670HD (BASF, SE), 3-aminopropyldiethoxymethylsilane is 3-aminopropyldiethoxymethylsilane (97.0%, Tokyo Chemical Industry Co., Ltd.), 40% BTMA methanol solution is benzyltrimethylammonium hydroxide, 40% methanol solution (Tokyo Chemical Industry Co., Ltd.), DMSO is dimethyl sulfoxide (Kishida Chemical Co., Ltd.), and 28% aqueous ammonia is ammonia (28%, Kishida Chemical Co., Ltd.).

TABLE 1

|  |  |  | Raw material | wt % |
|---|---|---|---|---|
| Examples 1 to 4 | First fluid | Liquid A | Acetic acid | 20.0 |
|  |  |  | TEOS | 0.3 |
|  |  |  | pure water | 79.7 |
|  | Second fluid | Liquid B | PR254 | 9.0 |
|  |  |  | 3-aminopropyldiethoxy-methylsilane | 0.9 |
|  |  |  | 40% BTMA methanol solution | 32.0 |
|  |  |  | DMSO | 58.1 |
|  | Third fluid | Liquid C | 28% aqueous ammnonia | 100.0 |

Then, the prepared first fluid, second fluid and third fluid were mixed using the fluid processing apparatus described in FIG. 1. Specifically, liquid A as the first fluid was introduced into the space between the processing surfaces 1 and 2, and while driving the processing member 10 at a rotational speed of 1,130 rpm, liquid B as the second fluid was introduced into the space between the processing surfaces 1 and 2, and were mixed in the thin film fluid to precipitate PR254 microparticles (Step 1). Next, liquid C as the third fluid was introduced into the space between the processing surfaces 1 and 2, and the fluid containing previously precipitated PR254 microparticles and liquid C were mixed in the thin film fluid (Step 2). These steps were performed under the operating conditions (introduction flow rate, introduction temperature) described in Table 2. In the thin film fluid, silicon oxide was precipitated on the surface of the previously precipitated PR254 microparticles, and the fluid containing the silicon oxide coated PR254 microparticles was discharged from the space between the processing surfaces 1 and 2 of the fluid processing apparatus. The discharged liquid (hereinafter, referred to as silicon oxide coated PR254 microparticle dispersion liquid) was collected in the beaker b through the vessel v.

In Example 1, the time after introducing liquid B in the space between the processing surfaces 1 and 2, until discharging the fluid containing the silicon oxide coated PR254 microparticles from the space between the processing surfaces 1 and 2, was 0.31 seconds, namely 1 second or less. The time was described as process time in Table 2, together with those in Examples 2 to 4.

For the pH measurement, the pH meter, model number D-51 (HORIBA Ltd.) was used. The pH of liquid A, liquid B and liquid C were measured at room temperature prior to introduction of liquid A, liquid B and liquid C into the fluid processing apparatus. The results are shown in Table 2. It is difficult to measure the pH of the mixed fluid immediately after mixing liquid A and liquid B, and the pH of mixed fluid immediately after mixing the mixed fluid containing the organic pigment microparticles and liquid C. Therefore, the silicon oxide coated PR254 microparticle dispersion liquid was discharged from the apparatus and collected in the beaker b, and the pH of the dispersion liquid was measured at room temperature.

Dry powders and wet cake samples were prepared from the silicon oxide coated PR254 microparticle dispersion liquid which was discharged from the fluid processing apparatus and collected in the beaker b. The preparation method was conducted according to a conventional method of this type of processing. The discharged silicon oxide coated PR254 microparticle dispersion liquid was collected, and the silicon oxide coated PR254 microparticles were settled, and the supernatant was removed. Thereafter, the silicon oxide coated PR254 microparticles were washed and settled five times to wash the silicon oxide coated PR254 microparticles. A part of the finally obtained wet cake of the silicon oxide coated PR254 microparticles was dried under a reduced pressure at room temperature for 20 hours to obtain the dry powders. The rest was used as the wet cake sample.

Comparative Examples 1 to 4

Silicon oxide coated PR254 microparticles produced by a production method in which the above Step 1 and Step 2 are not continuous, in other words, Step 2 is completed after the organic pigment microparticles have grown and/or aggregated, are exemplified as Comparative Examples 1 to 4.

In the same manner as in Examples 1 to 4 corresponding respectively to Comparative Examples 1 to 4, based on the

TABLE 2

|  | Introduction flow rate [ml/min] | | | Introduction temperature [° C.] | | | Process time | Discharged liquid | | Primary particle diameter (D) |
|---|---|---|---|---|---|---|---|---|---|---|
|  | Liquid A | Liquid B | Liquid C | Liquid A | Liquid B | Liquid C | [s] | pH | [° C.] | [nm] |
| Example 1 | 300 | 30 | 90 | 9 | 28 | 24 | 0.31 | 9.29 | 27.4 | 21.2 |
| Example 2 | 450 | 30 | 90 | 9 | 28 | 24 | 0.27 | 8.53 | 27.5 | 20.8 |
| Example 3 | 450 | 30 | 135 | 9 | 28 | 24 | 0.26 | 9.32 | 26.8 | 21.7 |
| Example 4 | 450 | 45 | 135 | 9 | 28 | 24 | 0.26 | 9.35 | 27.2 | 21.8 |

The introduction temperatures of liquid A, liquid B and liquid C shown in Table 2 were measured using a thermometer provided in a sealed introduction path leading to the space between the processing surfaces 1 and 2 (the first introduction part d1, the second introduction part d2 and the third introduction part d3). The introduction temperature of liquid A shown in Table 2 is the actual temperature of liquid A in the first introduction part d1. Similarly, the introduction temperature of liquid B is the actual temperature of liquid B in the second introduction part d2, and the introduction temperature of liquid C is the actual temperature of liquid C in the second introduction part d3.

formulation of liquid A shown in Comparative Examples 1 to 4 of Table 3, respective raw materials were weighed, and mixed homogeneously by stirring using CLEARMIX at preparation temperature of 25° C. and at the rotor rotational speed of 10,000 rpm for 30 min to prepare liquid A. Based on the formulation of liquid B shown in Comparative Examples 1 to 4 of Table 3, respective raw materials were weighed, and mixed homogeneously by stirring using CLEARMIX at preparation temperature of 40° C. and at the rotor rotational speed of 20,000 rpm for 30 min to prepare liquid B. The notation of the substances listed in Table 3 is the same as in Examples 1 to 4.

TABLE 3

|  |  |  | Raw material | wt % |
|---|---|---|---|---|
| Comparative Examples 1 to 4 | First fluid | Liquid A | Acetic acid | 20.0 |
|  |  |  | pure water | 80.0 |
|  | Second fluid | Liquid B | PR254 | 9.0 |
|  |  |  | 40% BTMA methanol solution | 32.0 |
|  |  |  | DMSO | 59.0 |

Then, the prepared first fluid and second fluid were mixed using the fluid processing apparatus described in FIG. 1 in the same manner as in Examples 1 to 4. However, in the fluid processing apparatus shown in FIG. 1, the processing surface 2 was changed to one having only a single ring shape opening d20 (an apparatus without p3, d30 and d3). Specifically, liquid A as the first fluid was introduced into the space between the processing surfaces 1 and 2, and while driving the processing member 10 at a rotational speed of 1,130 rpm, liquid B as the second fluid was introduced into the space between the processing surfaces 1 and 2, and liquid A and liquid B were mixed in the thin film fluid to precipitate PR254 microparticles between the processing surfaces 1 and 2 (Step 1). This step was performed under the operating conditions (introduction flow rate, introduction temperature) described in Table 4. The PR254 microparticles precipitated in the thin film fluid was discharged from the space between the processing surfaces 1 and 2 of the fluid processing apparatus. The discharged liquid (hereinafter, referred to as PR254 microparticle dispersion liquid) was collected in the beaker b through the vessel v. The operating conditions except for liquid C were the same as those in Examples 1 to 4.

TABLE 4

| | Introduction flow rate [ml/min] | | Introduction temperature [° C.] | | Discharged liquid | | Primary particle diameter |
|---|---|---|---|---|---|---|---|
| | Liquid A | Liquid B | Liquid A | Liquid B | pH | [° C.] | (D) [nm] |
| Comparative Example 1 | 300 | 30 | 9 | 28 | 3.12 | 26.4 | 20.6 |
| Comparative Example 2 | 450 | 30 | 9 | 28 | 2.86 | 27.5 | 20.2 |
| Comparative Example 3 | 450 | 30 | 9 | 28 | 2.86 | 26.8 | 20.4 |
| Comparative Example 4 | 450 | 45 | 9 | 28 | 3.08 | 27.2 | 21.2 |

The once collected PR254 microparticle dispersion liquid and ammonia as the third fluid were mixed using CLEARMIX. Specifically, while stirring 330 parts by weight (Comparative Example 1), 480 parts by weight (Comparative Example 2), 480 parts by weight (Comparative Example 3), or 495 parts by weight (Comparative Example 4) of the dispersion liquid containing the PR254 microparticles in the beaker b using CLEARMIX at a rotor rotation number of 10,000 rpm at a temperature of 25° C., 90 parts by weight (Comparative Examples 1 and 2), or 135 parts by weight (Comparative Example 3 and 4) of 28% aqueous ammonia as liquid C were added to the beaker b, and stirred for 30 minutes. Thereby, the dispersion liquid containing the PR254 microparticles and liquid C were homogeneously mixed to precipitate silicon oxide on the surface of the PR254 microparticles, whereby the surface of the PR254 microparticles was coated with silicon oxide (Step 2). In Comparative Examples 1 to 4, the time required from Step 1 to Step 2, in other words, the time until adding 28% aqueous ammonia as liquid C to the beaker b while stirring the dispersion liquid containing the PR254 microparticles in the beaker b, was 3 minutes in all the conditions of Comparative Examples 1 to 4.

(STEM Mapping)

Figure 3:
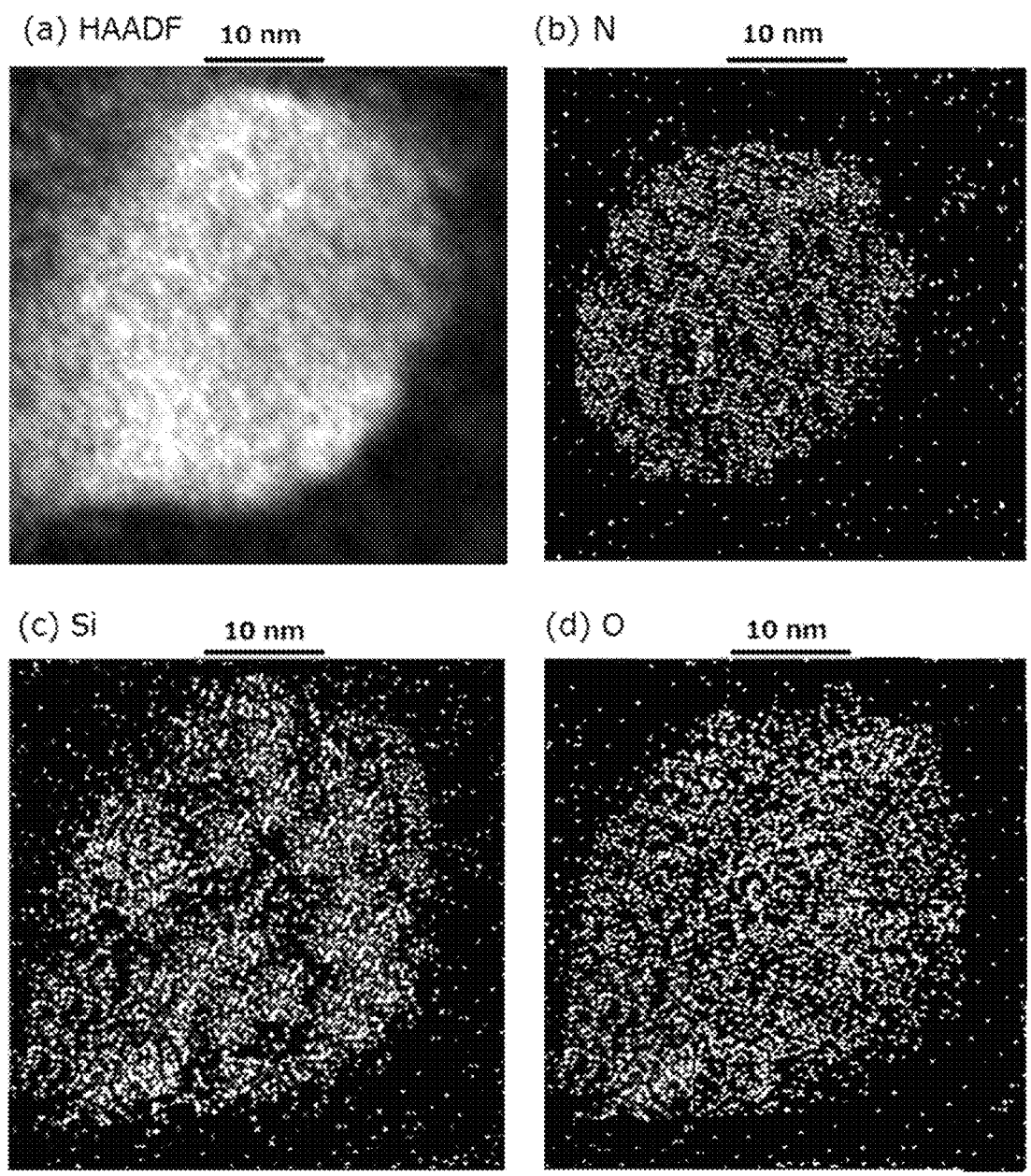
FIG. 3 shows a mapping result of elements using STEM in Example 1.

The mapping and quantification of elements contained in the silicon oxide coated PR254 microparticles obtained in Example 1 were performed using STEM (scanning transmission electron microscope). For the mapping and quantification of elements contained in the microparticles by STEM-EDS analysis, the atomic resolution analytical electron microscope JEM-ARM200F (JEOL Ltd.) equipped with the energy dispersive X-ray analyzer Centurio (JEOL Ltd.) was used. A beam diameter of 0.2 nm was used for analysis. The result is shown in FIG. 3. In FIG. 3, (a) shows a mapping of a dark-field image (HAADF image), (b) shows a mapping of nitrogen (N), (c) shows a mapping of silicon (Si), and (d) shows a mapping of oxygen (O). Regarding the particles observed in the HAADF image, distribution of silicon (Si) and oxygen (O) was observed in the entire particles, and distribution of nitrogen (N) derived from PR254 was observed in smaller area compared with the area distributed by silicon (Si) and oxygen (O). From this observation, it is considered that the silicon oxide coated PR254 microparticles obtained in Example 1 are in a state in which most of the surface of PR254 microparticles is covered with silicon oxide.

(IR Measurement)

Figure 6:
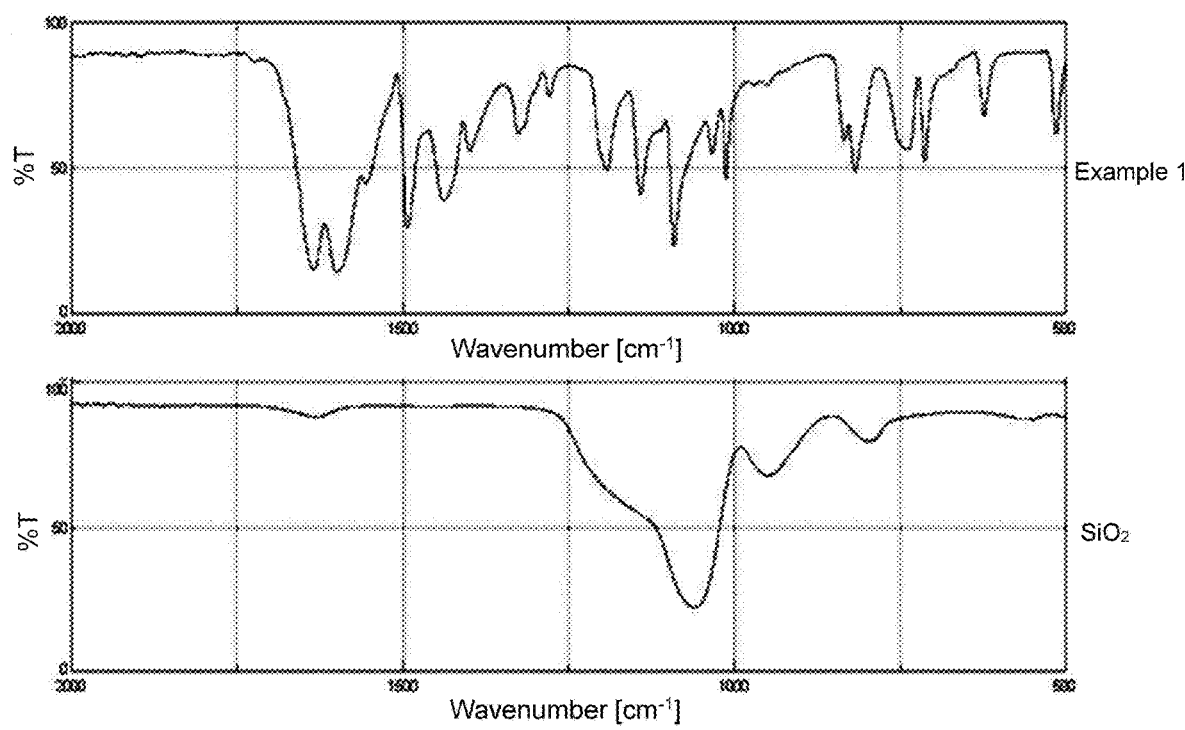
FIG. 6 shows a graph showing results of infrared spectroscopic measurement result in Example 1.

For the infrared spectroscopic (IR) measurement, the infrared spectrophotometer FT/IR-4100 (JASCO Corporation) was used. The measurement condition was the measurement method: an ATR method, the measurement range: 400 to 4,000 [cm$^{-1}$], and accumulated number of 128 times. FIG. 6 shows the measurement result of the dry powder of the silicon oxide coated PR254 microparticles obtained in Example 1 and the IR measurement result of $SiO_2$. As shown in FIG. 6, the silicon oxide coated PR254 microparticles have a tendency of decrease of the transmittance around 800 to 1200 cm$^{-1}$ which coincides with the absorption region of $SiO_2$. From this fact, the existence of $SiO_2$ is acknowledged in the PR254 microparticles obtained in Example 1. The existence of $SiO_2$ is also observed for the PR254 microparticles obtained in Examples 2 to 4 and Comparative Examples 1 to 4, although the data of Examples 2 to 4 and Comparative Examples 1 to 4 are omitted because they have similar tendency.

(Preparation of TEM Observation Sample)

A part of the wet cake sample of the silicon oxide coated PR254 microparticles after the washing process obtained in Step 1 of Examples 1 to 4 and Comparative Examples 1 to 4 was dispersed in 0.05 wt % aqueous Neogen R-K solution, dropped to a collodion membrane and dried to prepare a TEM (transmission electron microscope) observation sample. Primary particle diameters before and after silicon oxide coating were measured by TEM observation. Also, the dry powders of the silicon oxide coated PR254 microparticles obtained in Example 1 was dispersed in propylene glycol monomethyl acetate containing BYK-2000 (BYK-CHEMIE GMBH) as a dispersing agent at a concentration of 0.005 wt %, and dropped to a collodion membrane and dried to prepare a TEM observation sample. Primary particle diameters after organic solvent dispersion was measured by TEM observation. Transmission electron microscope SEM-2100 (JEOL Ltd.) was used for observation of the silicon oxide coated PR254 microparticles by TEM.

The observation condition was the acceleration voltage of 80 kV, and the observation magnification of 10,000 times or more. The particle diameters (D) described in Table 2 which correspond to the primary particle diameters, were calculated from the maximum distance between two points on the outer periphery of the particles including the coating layer, and the average value of the measured particle diameters of 100 particles was shown.

TEM observation samples were also similarly prepared for the silicon oxide coated PR254 microparticles obtained in Comparative Examples 1 to 4. TEM observation samples were also prepared for the PR254 microparticle dispersion liquid immediately after discharged from the space between processing surfaces 1 and 2 obtained in Comparative Examples 1 to 4. These samples were for measuring change ratio of the particle diameters before and after coating the surface of the organic pigment microparticles.

(Change Ratio of Particle Diameter Before and after Silicon Oxide Coating)

Table 5 shows change ratios of the particle diameters before and after silicon oxide coating in Examples 1 to 4 and Comparative Examples 1 to 4.

TABLE 5

| | Particle diameter before silicon oxide coating [nm] | Particle diameter after silicon oxide coating [nm] | Change ratio of particle diameter before and after silicon oxide coating [%] |
|---|---|---|---|
| Example 1 | 20.6 | 21.2 | 103 |
| Example 2 | 20.2 | 20.8 | 103 |
| Example 3 | 20.4 | 21.7 | 106 |
| Example 4 | 21.2 | 21.8 | 103 |
| Comparative Example 1 | 20.6 | 90.3 | 438 |
| Comparative Example 2 | 20.2 | 94.1 | 466 |
| Comparative Example 3 | 20.4 | 102.3 | 501 |
| Comparative Example 4 | 21.2 | 115.6 | 545 |

In Examples 1 to 4, PR254 microparticles were precipitated in the thin film fluid of the microreactor, and then the surface of the PR254 microparticles was continuously coated with silicon oxide in the thin film fluid. Since the particle diameter of the PR254 microparticles precipitated in the thin film fluid which were not subjected to coating treatment with silicon oxide was difficult to measure, the particle diameter of the PR254 microparticles which were prepared under the same conditions as in Examples 1 to 4, but were not subjected to coating treatment with silicon oxide and were discharged (that is, the PR254 microparticles obtained in Step 1 of Comparative Examples 1 to 4) was used instead. As described in Table 5, in Example 1, the primary particle diameter 21.2 nm of the PR254 microparticles which were precipitated in the thin film fluid of the microreactor and coated with silicon oxide, was 103%, namely 190% or less, relative to the primary particle diameter 20.6 nm of the PR254 microparticles which were precipitated in the thin film fluid of the microreactor, but were not coated with silicon oxide. On the other hand, in Comparative Example 1, the primary particle diameter 90.3 nm of the organic pigment microparticles which were precipitated in the thin film fluid, collected once, and subjected to coating treatment with silicon oxide, was 438%, namely exceeding 190%, relative to the primary particle diameter 20.6 nm of the PR254 microparticles without silicon oxide coating. The same tendency was shown in Examples 2 to 4 and Comparative Examples 2 to 4, and in the Examples, change ratio of the particle diameter before and after silicon oxide coating was 190% or less, but in the corresponding Comparative Examples, change ratio of the particle diameter before and after silicon oxide coating exceeded 190%.

Figure 7:
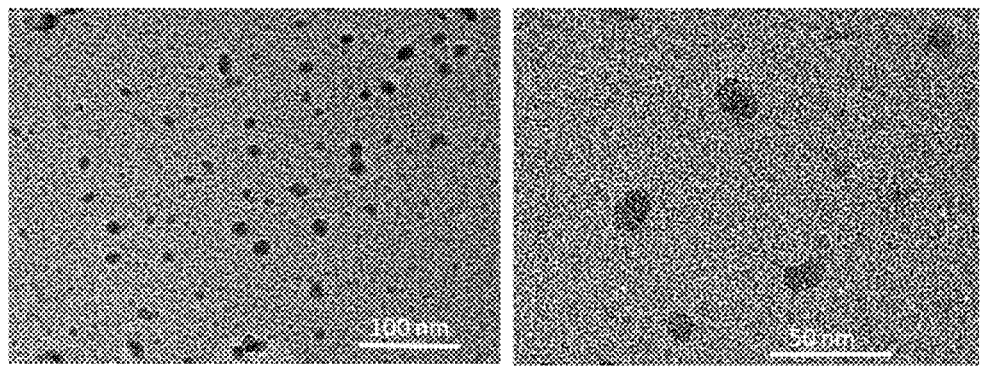
FIG. 7 shows a TEM photograph of PR254 microparticles before and after silicon oxide coating in Example 1 and Comparative Example 1.
Figure 7:
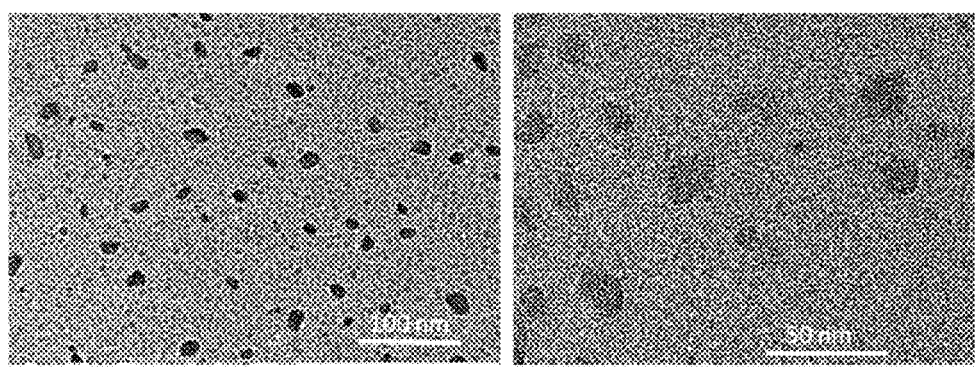
Figure 7:
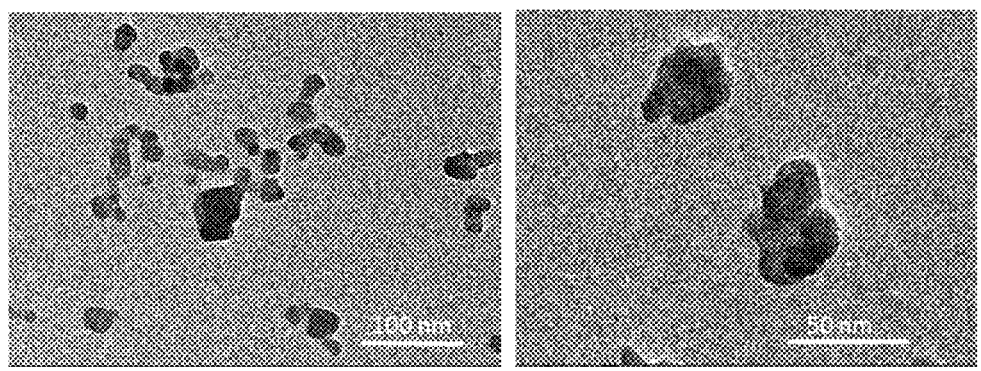
Figure 7:
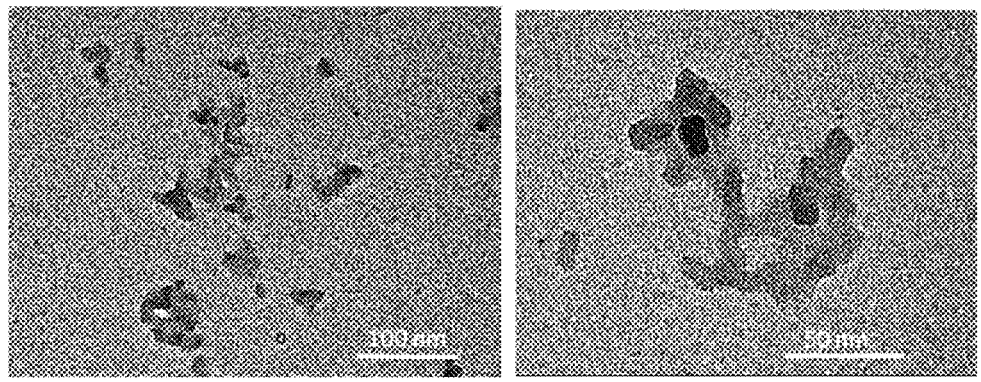

FIG. 7 (a) to (d) show a TEM photograph of Example 1 and Comparative Example 1. FIG. 7 (a) to (d) are explained below. FIG. 7 (a) shows a TEM photograph of a dispersion prepared by dispersing the PR254 microparticles before silicon oxide coating in Example 1 (the PR254 microparticles obtained in Step 1 of Comparative Example 1) in 0.05% aqueous Neogen R-K solution. FIG. 7 (b) shows a TEM photograph of a dispersion prepared by dispersing the silicon oxide coated PR254 microparticles obtained in Example 1 at a concentration of 0.005 wt % in propylene glycol monomethyl acetate dissolving BYK-2000 as a dispersing agent. FIG. 7 (c) shows a TEM photograph of a dispersion prepared by dispersing the PR254 microparticles obtained in Step 1 of Comparative Example 1 at a concentration of 0.005 wt % in propylene glycol monomethyl acetate dissolving BYK-2000 as a dispersing agent. FIG. 7 (d) shows a TEM photograph of a dispersion prepared by dispersing the silicon oxide coated PR254 microparticles obtained in Step 2 of Comparative Example 1 at a concentration of 0.005 wt % in propylene glycol monomethyl acetate dissolving BYK-2000 as a dispersing agent.

As shown in FIG. 7 (c), the PR254 microparticles which were not coated with silicon oxide on the surface appear to aggregate or grow in an organic solvent. In contrast, the particle diameter of the silicon oxide coated PR254 microparticles of Example 1 shown in FIG. 7 (b) was substantially unchanged compared with that of the PR254 microparticles before silicon oxide coating shown in FIG. 7 (a). As shown in FIG. 7 (d), it was observed that the silicon oxide coated PR254 microparticles obtained in Step 2 of Comparative Example 2 were coarsened because the coating treatment with silicon oxide was performed after the particles grew and/or aggregated, or because the coating treatment was not uniformly performed.

(UV-Vis Measurement)

Figure 4:
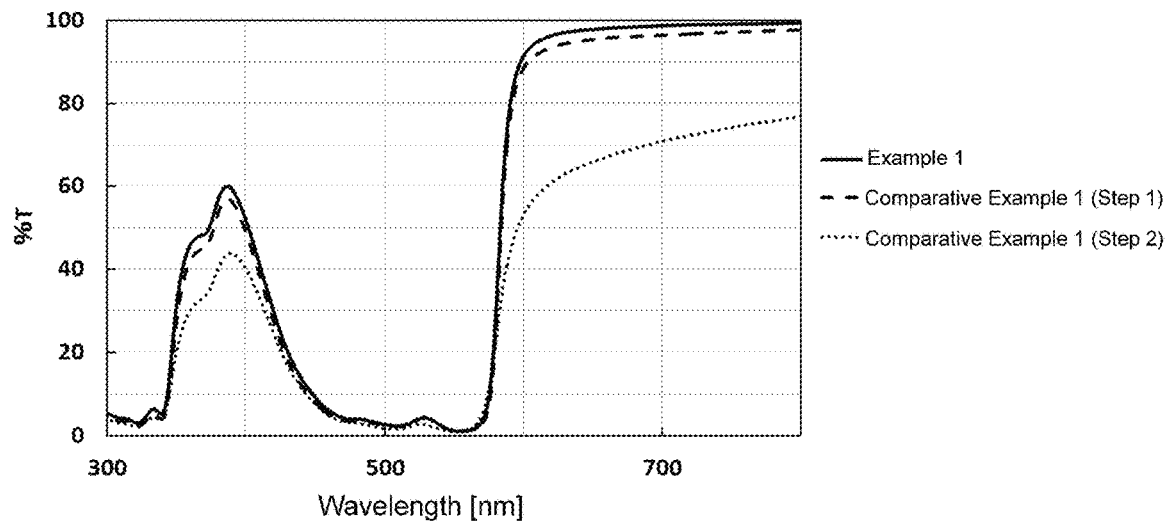
FIG. 4 shows an ultraviolet visible spectroscopic measurement result (transmission spectrum) in Example 1 and Comparative Example 1.
Figure 5:
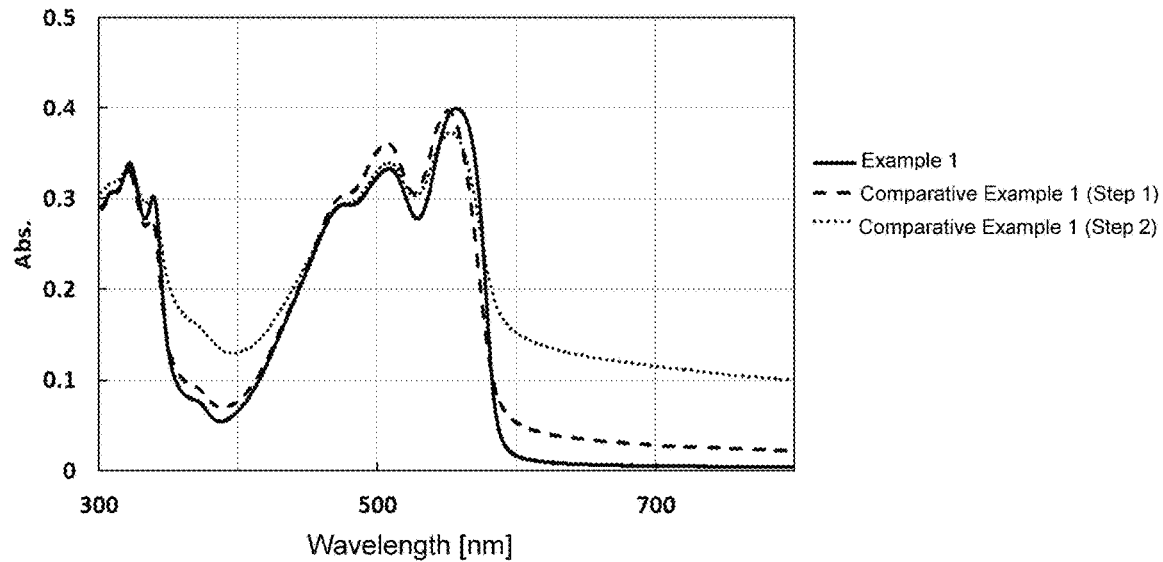
FIG. 5 shows an ultraviolet visible spectroscopic measurement result (absorption spectrum) in Example 1 and Comparative Example 1.

For the ultraviolet-visible spectroscopic analysis (UV-Vis), the ultraviolet-visible spectrophotometer UV2540 (JASCO Corporation) was used. The ultraviolet-visible spectroscopic analysis results of the dispersions in which silicon oxide coated PR254 microparticles obtained after completion of Step 2 of Example 1 or Comparative Example 1 and the PR254 microparticles not coated with silicon oxide obtained after Step 1 of Comparative Example 1 were dispersed at a concentration of 0.005 wt % in propylene glycol monomethyl acetate dissolving BYK-2000, are shown in FIG. FIG. 4 is a graph of transmittance, FIG. 5 is a graph of absorbance. It is understood that the dispersion of the PR254 microparticles coated with silicon oxide on the surface obtained in Example 1 shows the improved transmittance in the wavelength of 350 to 400 nm and 600 to 800 nm of the transmitting area, compared with the dispersion of the silicon oxide coated PR254 microparticles obtained in Step 2 of Comparative Example 1, which were coated with silicon oxide on the surface after the organic pigment microparticles grew and/or aggregated. It is understood that the dispersion also shows the improved transmittance in the wavelength of 350 to 400 nm and 600 to 800 nm of the transmitting area, compared with the dispersion of the PR254 microparticles not coated with silicon oxide obtained in Step 1 of Comparative Example 1. As shown in the above TEM photograph, it is considered that in the silicon oxide coated PR254 microparticles obtained after completion of Step 2 of Comparative Example 1, as shown in FIG. 7 (d), the surface of the organic pigment microparticles which were coarsened by growth and/or aggregation of the particles was coated with silicon oxide, and thereby the degree of light scattering increased and the transmittance was reduced.

Example 5: Silicon Oxide Coated PR254 Microparticles

The first fluid and the second fluid were prepared using CLEARMIX (product name: CLM-0.8 S, M. Technique Co., Ltd.). Specifically, based on the formulation of liquid A shown in Table 6, respective raw materials were weighed, and mixed homogeneously by stirring using CLEARMIX at preparation temperature of 25° C. and at the rotor rotational speed of 10,000 rpm for 30 min to prepare liquid A. Based on the formulation of liquid B shown in Table 6, respective raw materials were weighed, and mixed homogeneously by stirring using CLEARMIX at preparation temperature of 40° C. and at the rotor rotational speed of 20,000 rpm for 30 min to prepare liquid B.

The substances listed in Table 6 are the same as those in Examples 1 to 4.

Next, the prepared first fluid, second fluid and third fluid were mixed in the fluid processing apparatus shown in FIG. 1 under the operating conditions (introduction flow rate, introduction temperature) described in Table 7, and the silicon oxide coated PR254 microparticles dispersion liquid was discharged from the fluid processing apparatus. pH of the discharged fluid was 11.78 (measured temperature: 26.6° C.).

The method of washing particles and the analysis/evaluation method are the same as in Example 1. In Example 5, the time after introducing liquid B in the space between the processing surfaces 1 and 2, until discharging the fluid containing the silicon oxide coated PR254 microparticles from the space between the processing surfaces 1 and 2, was 0.32 seconds, namely 1 second or less. The time was described as process time in Table 7. Conditions not described in Table 6 and Table 7 are the same as those in Example 1.

TABLE 6

|  |  |  | Raw material | wt % |
|---|---|---|---|---|
| Example 5 | First fluid | Liquid A | pure water | 100.0 |
|  | Second fluid | Liquid B | PR254 | 9.0 |
|  |  |  | 40% BTMA methanol solution | 32.0 |
|  |  |  | DMSO | 59.0 |
|  | Third fluid | Liquid C | Acetic acid | 2.0 |
|  |  |  | TEOS | 1.8 |
|  |  |  | 3-aminopropyldiethoxy-methylsilane | 0.6 |
|  |  |  | pure water | 95.6 |

TABLE 7

|  | Introduction flow rate [ml/min] | | | Introduction temperature [° C.] | | | Process time [s] | Discharged liquid | | Primary particle diameter (D) [nm] |
|---|---|---|---|---|---|---|---|---|---|---|
|  | Liquid A | Liquid B | Liquid C | Liquid A | Liquid B | Liquid C |  | pH | [° C.] |  |
| Example 5 | 300 | 30 | 50 | 9 | 28 | 24 | 0.32 | 11.78 | 26.6 | 27.2 |

Comparative Example 5

As in Comparative Example 1, the silicon oxide coated PR254 microparticles produced by a production method in which the above Step 1 and Step 2 are not continuous, in other words, Step 2 is completed after the organic pigment microparticles have grown and/or aggregated, are exemplified as Comparative Example 5.

In the same manner as in Example 5, based on the formulation of liquid A shown in Comparative Example 5 of Table 8, respective raw materials were weighed, and mixed homogeneously by stirring using CLEARMIX at preparation temperature of 25° C. and at the rotor rotational speed of 10,000 rpm for 30 min to prepare liquid A. Based on the formulation of liquid B shown in Comparative Example 5 of Table 8, respective raw materials were weighed, and mixed homogeneously by stirring using CLEARMIX at preparation temperature of 40° C. and at the rotor rotational speed of 20,000 rpm for 30 min to prepare liquid B. The notation of the substances listed in Table 8 is the same as in Examples 1 to 4.

Then, the prepared first fluid and second fluid were mixed using the fluid processing apparatus described in FIG. 1 in the same manner as in Comparative Example 1. However, in the fluid processing apparatus shown in FIG. 1, the processing surface 2 was changed to one having only a single ring shape opening d20 (an apparatus without p3, d30 and d3). Specifically, liquid A as the first fluid was introduced into the space between the processing surfaces 1 and 2, and while driving the processing member 10 at a rotational speed of 1,130 rpm, liquid B as the second fluid was introduced into the space between the processing surfaces 1 and 2, and liquid A and liquid B were mixed in the thin film fluid to precipitate PR254 microparticles (Step 1). This step was performed under the operating conditions (introduction flow rate, introduction temperature) described in Table 9. The PR254 microparticles precipitated in the thin film fluid was discharged from the space between the processing surfaces 1 and 2 of the fluid processing apparatus. The discharged liquid (hereinafter, referred to as PR254 microparticle dispersion liquid) was collected in the beaker b through the vessel v. The operating conditions except for liquid C were the same as those in Example 5.

The once collected PR254 microparticle dispersion liquid and the third fluid were mixed using CLEARMIX. Specifically, while stirring 330 parts by weight of the dispersion liquid containing the PR254 microparticles in the beaker b using CLEARMIX at a rotor rotation number of 10,000 rpm at a temperature of 25° C., 50 parts by weight of liquid C were added to the beaker b, and stirred for 30 minutes. Thereby, the dispersion containing the PR254 microparticles and liquid C were homogeneously mixed to precipitate silicon oxide on the surface of the PR254 microparticles, whereby the surface of the PR254 microparticles was coated with silicon oxide (Step 2). Liquid C was a mixed liquid of 2 parts by weight of acetic acid, 1.8 parts by weight of TEOS, 0.6 parts by weight of 3-aminopropyldiethoxysilane and 95.6 parts by weight of pure water. In Comparative Example 5, the time required from Step 1 to Step 2, in other words, the time until adding 50 parts by weight of liquid C to the beaker b while stirring 330 parts by weight of the dispersion liquid containing the PR254 microparticles in the beaker b, was 2 minutes.

TABLE 8

| | | | Raw material | wt % |
|---|---|---|---|---|
| Comparative Example 5 | First fluid | Liquid A | pure water | 100.0 |
| | Second fluid | Liquid B | PR254 | 9.0 |
| | | | 40% BTMA methanol solution | 32.0 |
| | | | DMSO | 59.0 |

TABLE 9

| | Introduction flow rate [ml/min] | | Introduction temperature [° C.] | | Discharged liquid pH | Discharged liquid [° C.] | Primary particle diameter (D) [nm] |
|---|---|---|---|---|---|---|---|
| | Liquid A | Liquid B | Liquid A | Liquid B | | | |
| Comparative Example 5 | 300 | 30 | 9 | 28 | 14.1 | 25.3 | 25.2 |

(Change Ratio of Particle Diameter Before and after Silicon Oxide Coating)

Table 10 shows change ratios of the particle diameters before and after silicon oxide coating in Example 5 and Comparative Example 5.

TABLE 10

| | Particle diameter before silicon oxide coating [nm] | Particle diameter after silicon oxide coating [nm] | Change ratio of particle diameter before and after silicon oxide coating [%] |
|---|---|---|---|
| Example 5 | 25.2 | 27.2 | 108 |
| Comparative Example 5 | 25.2 | 129.2 | 513 |

In Example 5, PR254 microparticles were precipitated in the thin film fluid of the microreactor, and then the surface of the PR254 microparticles was continuously coated with silicon oxide in the thin film fluid. Since the particle diameter of the PR254 microparticles precipitated in the thin film fluid which were not subjected to coating treatment with silicon oxide was difficult to measure, the particle diameter of the PR254 microparticles which were prepared under the same conditions as in Example 5, but were not subjected to coating treatment with silicon oxide and were discharged (that is, the PR254 microparticles obtained in Step 1 of Comparative Example 5) was used instead. As described in Table 10, in Example 5, the primary particle diameter 27.2 nm of the PR254 microparticles which were precipitated in the thin film fluid of the microreactor and coated with silicon oxide, was 108%, namely 190% or less, relative to the primary particle diameter 25.2 nm of the PR254 microparticles which were was precipitated in the thin film fluid of the microreactor, but were not coated with silicon oxide. On the other hand, in Comparative Example 5, the primary particle diameter 129.2 nm of the organic pigment microparticles which were precipitated in the thin film fluid, collected once, and subjected to coating treatment with silicon oxide, was 513%, namely exceeding 190%, relative to the primary particle diameter 25.2 nm of the PR254 microparticles without silicon oxide coating.

(STEM Mapping)

The mapping and quantification of elements in Example 5 were performed using STEM (scanning transmission electron microscope). Similarly to those in Example 1, regarding the particles observed in the HAADF image, distribution of silicon (Si) and oxygen (O) was observed in the entire particles, and distribution of nitrogen (N) derived from PR254 was observed in smaller area compared with the area distributed by silicon (Si) and oxygen (O).

Example 6: Silicon Oxide Coated PR122 Microparticles

Example 6 shows an example in which PR122 microparticles of an organic pigment of a quinacridone were coated with silicon oxide. The first fluid and the second fluid were prepared using the high-speed rotary dispersion emulsification apparatus CLEARMIX (product name: CLM-0.8 S, M. Technique Co., Ltd.). Specifically, based on the formulation of liquid A shown in Example 6 of Table 11, respective raw materials were weighed, and mixed homogeneously by stirring using CLEARMIX at preparation temperature of 25° C. and at the rotor rotational speed of 10,000 rpm for 30 min to prepare liquid A. Based on the formulation of liquid B shown in Example 6 of Table 11, respective raw materials were weighed, and mixed homogeneously by stirring using CLEARMIX at preparation temperature of 40° C. and at the rotor rotational speed of 20,000 rpm for 30 min to prepare liquid B.

For the substances listed in Table 11, acetic acid is acetic acid (99.7%, Kanto Chemical Co., Inc.), TEOS is tetraethyl orthosilicate (Wako Pure Chemical Industries, Ltd.), PR122 is Quinacridone Red E2b (BASF, SE), 40% BTMA methanol solution is benzyltrimethylammonium hydroxide, 40% methanol solution (Tokyo Chemical Industry Co., Ltd.), DMSO is dimethyl sulfoxide (Kishida Chemical Co., Ltd.), CuPc (copper phthalocyanine) is Heliogen Blue L7080 (BASF, SE), 3-aminopropyldiethoxymethylsilane is 3-aminopropyldiethoxymethylsilane (97.0%, Tokyo Chemical Industry Co., Ltd.), 97% $H_2SO_4$ is sulfuric acid (97%, Kishida Chemical Co., Ltd.), and 28% aqueous ammonia is ammonia (28%, Kishida Chemical Co., Ltd.).

Next, the prepared first fluid, second fluid and third fluid were mixed in the fluid processing apparatus shown in FIG. 1 under the operating conditions (introduction flow rate, introduction temperature) described in Table 12, and the fluid containing the silicon oxide coated PR122 microparticles was discharged from the fluid processing apparatus. pH of the discharged fluid was 9.13 (measured temperature: 26.4° C.).

The method of washing particles and the analysis/evaluation method are the same as in Example 1.

In Example 6, the time after introducing liquid B in the space between the processing surfaces 1 and 2, until discharging the fluid containing the silicon oxide coated PR122 microparticles from the space between the processing surfaces 1 and 2, was 0.26 seconds, namely 1 second or less. The time was described as process time in Table 12.

Conditions not described in Table 11 and Table 12 are the same as those in Example 1.

Example 7: Silicon Oxide Coated Copper Phthalocyanine Microparticles

Example 7 shows an example in which copper phthalocyanine microparticles of an organic pigment of a phthalocyanine were coated with silicon oxide.

The first fluid and the second fluid were prepared using the high-speed rotary dispersion emulsification apparatus CLEARMIX (product name: CLM-0.8S, M. Technique Co., Ltd.). Specifically, based on the formulation of liquid A shown in Example 7 of Table 11, respective raw materials

TABLE 11

| | | | Raw material | wt % |
|---|---|---|---|---|
| Example 6 | First fluid | Liquid A | Acetic acid | 20.0 |
| | | | TEOS | 0.1 |
| | | | pure water | 79.9 |
| | Second fluid | Liquid B | PR122 | 3.0 |
| | | | 3-aminopropyldiethoxy-methylsilane | 0.3 |
| | | | 40% BTMA methanol solution | 10.0 |
| | | | DMSO | 86.7 |
| | Third fluid | Liquid C | 28% aqueous ammnonia | 100.0 |
| Example 7 | First fluid | Liquid A | Acetic acid | 2.00 |
| | | | TEOS | 0.20 |
| | | | 3-aminopropyldiethoxy-methylsilane | 0.06 |
| | | | pure water | 97.74 |
| | Second fluid | Liquid B | CuPc | 3.00 |
| | | | 97% H$_2$SO$_4$ | 97.00 |
| | Third fluid | Liquid C | 28% aqueous ammnonia | 100.00 |

TABLE 12

| | Introduction flow rate [ml/min] | | | Introduction temperature [° C.] | | | Process time [s] | Discharged liquid | | Primary particle diameter (D) [nm] |
|---|---|---|---|---|---|---|---|---|---|---|
| | Liquid A | Liquid B | Liquid C | Liquid A | Liquid B | Liquid C | | pH | [° C.] | |
| Example 6 | 450 | 45 | 135 | 9 | 28 | 24 | 0.26 | 9.13 | 26.4 | 19.8 |
| Example 7 | 450 | 45 | 150 | 9 | 30 | 24 | 0.25 | 9.35 | 28.5 | 32.8 | were weighed, and mixed homogeneously by stirring using CLEARMIX at preparation temperature of 25° C. and at the rotor rotational speed of 10,000 rpm for 30 min to prepare liquid A. Based on the formulation of liquid B shown in Example 7 of Table 11, respective raw materials were weighed, and mixed homogeneously by stirring using CLEARMIX at preparation temperature of 40° C. and at the rotor rotational speed of 20,000 rpm for 30 min to prepare liquid B.

Next, the prepared first fluid, second fluid and third fluid were mixed in the fluid processing apparatus shown in FIG. 1 under the operating conditions (introduction flow rate, introduction temperature) described in Table 12, and the fluid containing the silicon oxide coated copper phthalocyanine microparticles was discharged from the fluid processing apparatus. pH of the discharged fluid was 9.35 (measured temperature: 28.5° C.).

The method of washing particles and the analysis/evaluation method are the same as in Example 1.

In Example 7, the time after introducing liquid B in the space between the processing surfaces 1 and 2, until discharging the fluid containing the silicon oxide coated copper phthalocyanine microparticles from the space between the processing surfaces 1 and 2, was about 0.25 seconds, namely 1 second or less. The time was described as process time in Table 12.

Conditions not described in Table 12 are the same as those in Example 1.

(STEM Mapping)

The mapping and quantification of elements in Examples 6 and 7 were performed using STEM (scanning transmission electron microscope). Similarly to those in Example 1, regarding the particles observed in the HAADF image, distribution of silicon (Si) and oxygen (O) was observed in the entire particles, and in Example 6, distribution of nitrogen (N) derived from PR122 was observed in smaller area compared with the area distributed by silicon (Si) and oxygen (O).

In Example 7, distribution of copper (Cu) derived from copper phthalocyanine was observed in smaller area compared with the area distributed by silicon (Si) and oxygen (O).

Comparative Examples 6 and 7

Silicon oxide coated PR122 microparticles and silicon oxide coated copper phthalocyanine microparticles which are produced by a production method in which the above Step 1 and Step 2 are not continuous, in other words, Step 2 is completed after the organic pigment microparticles have grown and/or aggregated, are exemplified respectively as Comparative Examples 6 and 7.

In the same manner as in Examples 6 and 7, based on the formulation of liquid A shown in Comparative Examples 6 and 7 of Table 13, respective raw materials were weighed, and mixed homogeneously by stirring using CLEARMIX at preparation temperature of 25° C. and at the rotor rotational speed of 10,000 rpm for 30 min to prepare liquid A. Based on the formulation of liquid B shown in Comparative Examples 6 and 7 of Table 13, respective raw materials were weighed, and mixed homogeneously by stirring using CLEARMIX at preparation temperature of 40° C. and at the rotor rotational speed of 20,000 rpm for 30 min to prepare liquid B. The notation of the substances listed in Table 13 is the same as in Examples 6 and 7.

TABLE 13

| | | | Raw material | wt % |
|---|---|---|---|---|
| Comparative Example 6 | First fluid | Liquid A | Acetic acid | 20.0 |
| | | | TEOS | 0.1 |
| | | | pure water | 79.9 |
| | Second fluid | Liquid B | PR122 | 3.0 |
| | | | 3-aminopropyldiethoxy-methylsilane | 0.3 |
| | | | 40% BTMA methanol solution | 10.0 |
| | | | 97% $H_2SO_4$ | 86.7 |
| Comparative Example 7 | First fluid | Liquid A | Acetic acid | 2.00 |
| | | | TEOS | 0.20 |
| | | | 3-aminopropyldiethoxy-methylsilane | 0.06 |
| | | | pure water | 97.74 |
| | Second fluid | Liquid B | CuPc | 3.00 |
| | | | 97% $H_2SO_4$ | 97.00 |

Then, the prepared first fluid and second fluid were mixed using the fluid processing apparatus described in FIG. 1 in the same manner as in Examples 6 and 7. However, in the fluid processing apparatus shown in FIG. 1, the processing surface 2 was changed to one having only a single ring shape opening d20 (an apparatus without p3, d30 and d3). Specifically, liquid A as the first fluid was introduced into the space between the processing surfaces 1 and 2, and while driving the processing member 10 at a rotational speed of 1,130 rpm, liquid B as the second fluid was introduced into the space between the processing surfaces 1 and 2, and were mixed in the thin film fluid to precipitate PR122 microparticles or copper phthalocyanine microparticles between the processing surfaces 1 and 2 (Step 1). This step was performed under the operating conditions (introduction flow rate, introduction temperature) described in Table 14. The fluid containing the PR122 microparticles or the fluid containing the copper phthalocyanine microparticles precipitated in the thin film fluid was discharged from the space between the processing surfaces 1 and 2 of the fluid processing apparatus. The discharged liquid (hereinafter, referred to as PR122 microparticle dispersion liquid or copper phthalocyanine microparticle dispersion liquid) was collected in the beaker b through the vessel v. The operating conditions except for liquid C were the same as those in Examples 6 and 7.

TABLE 14

| | Introduction flow rate [ml/min] | | Introduction temperature [° C.] | | Dis-charged | | Primary particle diameter |
|---|---|---|---|---|---|---|---|
| | Liquid A | Liquid B | Liquid A | Liquid B | liquid pH | [° C.] | (D) [nm] |
| Comparative Example 6 | 450 | 45 | 9 | 28 | 2.18 | 26.4 | 18.6 |
| Comparative Example 7 | 450 | 45 | 9 | 28 | <1 | | 30.4 |

The once collected PR122 microparticle dispersion liquid and ammonia as the third fluid were mixed using CLEARMIX. Specifically, while stirring 495 parts by weight of the dispersion liquid containing the PR122 microparticles (Comparative Example 6) or 495 parts by weight of the dispersion liquid containing the copper phthalocyanine microparticles (Comparative Example 7) in the beaker b using CLEARMIX at a rotor rotation number of 10,000 rpm at a temperature of 25° C., 135 parts by weight of 28% aqueous ammonia as liquid C were added to the beaker b, and stirred for 30 minutes. Thereby, the dispersion containing the PR122 microparticles or the copper phthalocyanine microparticles and liquid C were homogeneously mixed to precipitate silicon oxide on the surface of the PR122 microparticles or the copper phthalocyanine microparticles, whereby the surface of the PR122 microparticles or the copper phthalocyanine microparticles was coated with silicon oxide (Step 2). In Comparative Examples 6 or 7, the time required from Step 1 to Step 2, in other words, the time until adding 28% aqueous ammonia as liquid C to the beaker b while stirring the dispersion liquid containing the PR122 microparticles or the copper phthalocyanine microparticles in the beaker b, was 2 minutes in all the conditions of Comparative Examples 6 and 7.

(Change Ratio of Particle Diameter Before and after Silicon Oxide Coating)

Table 15 shows change ratios of the particle diameters before and after silicon oxide coating in Examples 6 and 7 and Comparative Examples 6 and 7.

TABLE 15

| | Particle diameter before silicon oxide coating [nm] | Particle diameter after silicon oxide coating [nm] | Change ratio of particle diameter before and after silicon oxide coating [%] |
|---|---|---|---|
| Example 6 | 18.6 | 19.8 | 106 |
| Example 7 | 30.4 | 32.8 | 108 |
| Comparative Example 6 | 18.6 | 117.4 | 631 |
| Comparative Example 7 | 30.4 | 134.6 | 443 |

In Examples 6 and 7, organic pigment microparticles were precipitated in the thin film fluid of the microreactor, and then the surface of the organic pigment microparticles was continuously coated with silicon oxide in the thin film fluid. Since the particle diameter of the organic pigment microparticles precipitated in the thin film fluid which were not subjected to coating treatment with silicon oxide was difficult to measure, the particle diameter of the microparticles which were prepared under the same conditions as in Examples 6 and 7, but were not subjected to coating treatment with silicon oxide and were discharged (that is, the microparticles obtained in Step 1 of Comparative Examples 6 and 7) was used instead. As described in Table 15, in Example 6, the primary particle diameter 19.8 nm of the PR122 microparticles which were precipitated in the thin film fluid of the microreactor and coated with silicon oxide, was 106%, namely 190% or less, relative to the primary particle diameter 18.6 nm of the PR122 microparticles which were was precipitated in the thin film fluid of the microreactor, but were not coated with silicon oxide. On the other hand, in Comparative Example 6, the primary particle diameter 117.4 nm of the organic pigment microparticles which were precipitated in the thin film fluid, collected once, and subjected to coating treatment with silicon oxide, was 631%, namely exceeding 190%, relative to the primary particle diameter 18.6 nm of the PR122 microparticles without silicon oxide coating. In Example 7, the primary particle diameter 32.8 nm of the copper phthalocyanine microparticles which were precipitated in the thin film fluid of the microreactor and coated with silicon oxide, was 108%, namely 190% or less, relative to the primary particle diameter 30.4 nm of the copper phthalocyanine microparticles which were was precipitated in the thin film fluid of the microreactor, but were not coated with silicon oxide. On the other hand, in Comparative Example 7, the primary particle diameter 134.6 nm of the organic pigment microparticles which were precipitated in the thin film fluid, collected once, and subjected to coating treatment with silicon oxide, was 443%, namely exceeding 190%.

Example 8

In Example 8, Step 1 and Step 2 were performed in a continuous fluid in different apparatus. Step 1 was performed between the processing surfaces described above, and Step 2 was performed in a continuous type mixing reaction apparatus within a predetermined time until the organic pigment microparticles grow and/or aggregate. Example 8 is explained below.

First, liquids A to C were prepared according to the formulations of the first to third fluids listed in Table 1, in the same manner as in Example 1.

Then, the prepared first fluid and second fluid were mixed using the fluid processing apparatus described in FIG. 1. Specifically, under the operating conditions (introduction flow rate, introduction temperature) described in Table 16, liquid A as the first fluid was introduced into the space between the processing surfaces 1 and 2, and liquid B as the second fluid was introduced into the space between the processing surfaces 1 and 2, and liquid A and liquid B were mixed in the thin film fluid to precipitate PR254 microparticles between the processing surfaces 1 and 2. However, in the fluid processing apparatus shown in FIG. 1, the processing surface 2 was changed to one having only a single ring shape opening d20 (an apparatus without p3, d30 and d3). Next, liquid C as the third fluid was introduced from an inlet provided in the vessel v (not shown in FIG. 1), and the fluid containing the precipitated PR254 microparticles and liquid C were mixed inside the vessel v and discharged from the vessel v, and collected in the beaker b. The mixed fluid collected in the beaker b is referred to as the silicon oxide coated PR254 microparticle dispersion liquid, because the silicon oxide coated PR254 microparticles were contained in the mixed fluid as described later.

In Example 8, the time after introducing liquid B in the space between the processing surfaces 1 and 2, until obtaining the silicon oxide coated PR254 microparticle dispersion liquid, was about 0.65 seconds, namely 1 second or less. The time was described as process time in Table 16.

Dry powders and a wet cake sample were prepared from the collected silicon oxide coated PR254 microparticle dispersion liquid. The method of washing particles and the analysis/evaluation method are the same as in Example 1. TEM observation was performed in the same procedure as in Example 1, and the primary particle diameters (D) were obtained as shown in Table 17. Conditions not described in Table 16 are the same as those in Example 1.

Comparative Example 8

In Comparative Example 8 corresponding to Example 8, Step 1 was performed in a continuous fluid, and Step 2 was performed in a batch system. The details are explained below.

First, liquids A to C were prepared according to the formulations of the first to third fluids listed in Table 1, in the same manner as in Example 1.

Then, the prepared first fluid and second fluid were mixed using the fluid processing apparatus described in FIG. 1. Specifically, under the operating conditions (introduction flow rate, introduction temperature) described in Table 16, liquid A as the first fluid was introduced into the space between the processing surfaces 1 and 2, and liquid B as the second fluid was introduced into the space between the processing surfaces 1 and 2, and liquid A and liquid B were mixed in the thin film fluid to precipitate PR254 microparticles between the processing surfaces.

Next, the fluid containing the PR254 particles was discharged from the vessel v and collected in the beaker b. In the beaker b, 90 mL of liquid C as the third fluid was added in advance, and the fluid containing the discharged PR254 microparticles and liquid C were mixed in the beaker b. The mixed fluid collected in the beaker b is referred to as the silicon oxide coated PR254 microparticle dispersion liquid, because the silicon oxide coated PR254 microparticles were contained in the mixed fluid as described later. The time after introducing liquid B in the space between the processing surfaces 1 and 2, until obtaining the silicon oxide coated PR254 microparticle dispersion liquid, was about 20 seconds, namely 1 second or more.

Dry powders and a wet cake sample were prepared from the collected silicon oxide coated PR254 microparticle dispersion liquid. The method of washing particles and the analysis/evaluation method are the same as in Example 1. TEM observation was performed in the same procedure as in Example 1, and the result was obtained as shown in Table 17. Conditions not described in Table 16 are the same as those in Example 1.

TABLE 16

| | Introduction flow rate [ml/min] | | | Introduction temperature [° C.] | | | Process time [s] | Discharged liquid | | Primary particle diameter (D) [nm] |
|---|---|---|---|---|---|---|---|---|---|---|
| | Liquid A | Liquid B | Liquid C | Liquid A | Liquid B | Liquid C | | pH | [° C.] | |
| Example 8 | 300 | 30 | 90 | 9 | 28 | 24 | 0.65 | 9.31 | 27.9 | 27.8 |
| Comparative Example 8 | 300 | 30 | — | 9 | 28 | — | 20 | 9.26 | 28.1 | 99.4 |

TABLE 17

| | Particle diameter before silicon oxide coating [nm] | Particle diameter after silicon oxide coating [nm] | Change ratio of particle diameter before and after silicon oxide coating [%] |
|---|---|---|---|
| Example 8 | 20.6 | 27.8 | 139 |
| Comparative Example 8 | 20.6 | 99.4 | 483 |

In Example 8, PR254 microparticles were precipitated in the thin film fluid of the microreactor, and then the surface of the PR254 microparticles was continuously coated with silicon oxide, though it was not in the thin film fluid. In Comparative Example 8, PR254 microparticles were precipitated in the thin film fluid of the microreactor, and then the surface of PR254 microparticles was coated with silicon oxide in a batch system. Since the particle diameter of the PR254 microparticles precipitated in the thin film fluid which were not subjected to coating treatment with silicon oxide was difficult to measure, the particle diameter of the PR254 microparticles which were prepared under the same conditions as in Example 8, namely the same conditions as in Example 1, but were not subjected to coating treatment with silicon oxide, and were discharged (that is, the PR254 microparticles obtained in Step 1 of Comparative Example 1) was used instead. As described in Table 17, the primary particle diameter of the silicon oxide coated PR254 microparticles obtained in Example 8, was 190% or less, relative to the primary particle diameter 20.6 nm of the organic pigment microparticles which were was precipitated in the thin film fluid of the microreactor, but were not coated with silicon oxide. However, the primary particle diameter 99.4 nm of the silicon oxide coated PR254 microparticles obtained in Comparative Example 8, was 438% relative to the primary particle diameter 20.6 nm of the organic pigment microparticles without silicon oxide coating. In addition, as a result of analysis and evaluation, it was confirmed that the silicon oxide coated PR254 microparticles were obtained as in Example 1.

REFERENCE SIGNS LIST

1 the first processing surface
2 the second processing surface
10 the first processing unit
11 the first holder
20 the second processing unit
21 the second holder
d1 the first introduction part
d2 the second introduction part
d3 the third introduction part
d20 opening
d30 opening

The invention claimed is:

1. A method of producing organic pigment microparticles, comprising the following steps:
Step 1 of precipitating organic pigment microparticles by mixing an organic pigment raw material liquid in which an organic pigment raw material is mixed with a solvent, and a precipitation solvent for precipitating microparticles of the organic pigment from the organic pigment raw material liquid in a thin film fluid formed by introducing the organic pigment raw material liquid and the precipitation solvent in a space between at least two processing surfaces which are disposed so as to face each other, being capable of approaching to and separating from each other, at least one of which rotates relatively to the other; and
Step 2 of coating at least a part of each of the organic pigment microparticles individually with an oxide coating, in order to suppress particle growth and/or aggregation of the precipitated organic pigment microparticles;
wherein the oxide coating is optically colorless and transparent, and
Step 1 and Step 2 are performed out continuously in the thin film fluid, and
after Step 1, Step 2 is completed at a predetermined time until the organic pigment microparticles grow and/or aggregate, and thereby particle growth and/or aggregation of the precipitated organic pigment microparticles are suppressed.

2. The method for producing organic pigment microparticles according to claim 1, wherein the primary particle diameter of the organic pigment microparticles obtained by completion of Step 2 is 190% or less relative to the primary particle diameter of the organic pigment microparticles precipitated in Step 1.

3. The method for producing organic pigment microparticles according to claim 1,
wherein in Step 2, the at least a part of the organic pigment microparticles in the thin film fluid is coated with the oxide coating, by introducing an oxide coating raw material and a substance for treating the oxide coating raw material into the thin film fluid, and
either of the oxide coating raw material or the substance for treating the oxide coating raw material is introduced into the thin film fluid before or at the same time as precipitation of the organic pigment microparticles.

4. The method for producing organic pigment microparticles according to claim 3, wherein at least the oxide coating raw material and the precipitation solvent are introduced into the thin film fluid at the same time.

5. The method for producing organic pigment microparticles according to claim 4, further comprising a preparation step for homogeneously mixing substances introduced into the thin film fluid at the same time.

6. The method for producing organic pigment microparticles according to claim 5, wherein the preparation step is performed by a stirring machine equipped with stirring blades.

7. The method for producing organic pigment microparticles according to claim 3, wherein at least the substance for treating the oxide coating raw material and the organic pigment raw material liquid are introduced into the thin film fluid at the same time.

8. The method for producing organic pigment microparticles according to claim 1,
wherein in Step 2, the surface of the organic pigment microparticles are coated with a coupling agent is interposed between the surface of the organic pigment microparticles and the oxide coating, and
the coupling agent is optically colorless and transparent.

9. The method for producing organic pigment microparticles according to claim 8,
wherein in Step 2, the at least a part of the organic pigment microparticles in the thin film fluid is coated with the oxide coating, by introducing an oxide coating raw material, a substance for treating the oxide coating raw material into the thin film fluid, and the coupling agent and
the organic pigment raw material liquid and the coupling agent are introduced into the thin film fluid at the same time, or the precipitation solvent and the coupling agent are introduced into the thin film fluid at the same time.

10. The method for producing organic pigment microparticles according to claim 9,
wherein a first fluid, a second fluid and a third fluid are used;
the first fluid contains the precipitation solvent and the oxide coating raw material, and the second fluid contains the organic pigment raw material liquid, and the third fluid contains the substance for treating the oxide coating raw material;

the coupling agent is included in either of the first fluid or the second fluid;

a central side of the at least two processing surfaces is an upstream side and an outside of the at least two processing surfaces is a downstream side;

the first fluid passes between the at least two processing surfaces from the upstream side to the downstream side while forming the thin film fluid;

the second fluid passes through a second flow path independent of a first flow path into which the first fluid is introduced between the at least two processing surfaces, and is introduced into the space between the at least two processing surfaces from an opening formed on at least one of the at least two processing surfaces, and the organic pigment raw material liquid and the precipitation solvent are mixed between the at least two processing surfaces to precipitate the organic pigment microparticles, but the precipitation solvent and the oxide coating raw material do not react with each other;

the third fluid passes through a third flow path independent of the first flow path and the second flow path, and is introduced into the space between the at least two processing surfaces from an opening formed on at least one of the at least two processing surfaces;

the opening of the second flow path is located upstream of the opening of the third flow path; and the thin film fluid containing the precipitated organic pigment microparticles and the third fluid are mixed between the at least two processing surfaces, so that the oxide coating raw material reacts, and at least a part of the organic pigment microparticles in the thin film fluid is coated with the oxide coating.

11. The method for producing organic pigment microparticles according to claim 9, wherein a first fluid, a second fluid and a third fluid are used;

the first fluid contains the precipitation solvent, the second fluid contains the organic pigment raw material liquid and the substance for treating the oxide coating raw material, and the third fluid contains the oxide coating raw material and the coupling agent;

a central side of the at least two processing surfaces is an upstream side and an outside of the at least two processing surfaces is a downstream side;

the first fluid passes between the at least two processing surfaces from the upstream side to the downstream side while forming the thin film fluid;

the second fluid passes through a second flow path independent of a first flow path into which the first fluid is introduced between the at least two processing surfaces, and is introduced into the space between the at least two processing surfaces from an opening formed on at least one of the at least two processing surfaces, and the organic pigment raw material liquid and the precipitation solvent are mixed between the at least two processing surfaces to precipitate the organic pigment microparticles;

the third fluid passes through a third flow path independent of the first flow path and the second flow path, and is introduced into the space between the at least two processing surfaces from an opening formed on at least one of the at least two processing surfaces;

the opening of the second flow path is located upstream of the opening of the third flow path; and the thin film fluid containing the precipitated organic pigment microparticles and the third fluid are mixed between the at least two processing surfaces, so that the oxide coating raw material reacts, and at least a part of the organic pigment microparticles in the thin film fluid is coated with the oxide coating.

12. The method for producing organic pigment microparticles according to claim 1, wherein the organic pigment is a diketopyrrolopyrrole, a quinacridone or a phthalocyanine.

13. A method of producing organic pigment microparticles, comprising the following steps:

Step 1 of precipitating organic pigment microparticles by mixing an organic pigment raw material liquid in which an organic pigment raw material is mixed with a solvent, and a precipitation solvent for precipitating microparticles of the organic pigment from the organic pigment raw material liquid in a thin film fluid formed by introducing the organic pigment raw material liquid and the precipitation solvent in a space between at least two processing surfaces which are disposed so as to face each other, being capable of approaching to and separating from each other, at least one of which rotates relatively to the other; and Step 2 of coating at least a part of each of the organic pigment microparticles individually with an oxide coating, in order to suppress particle growth and/or aggregation of the precipitated organic pigment microparticles;

wherein the oxide coating is optically colorless and transparent, and after Step 1, Step 2 is completed at a predetermined time until the organic pigment microparticles grow and/or aggregate, and thereby particle growth and/or aggregation of the precipitated organic pigment microparticles are suppressed.

14. A method of producing organic pigment microparticles according to claim 13, comprising the following steps:

Step 1 of precipitating organic pigment microparticles by mixing an organic pigment raw material liquid in which an organic pigment raw material is mixed with a solvent, and a precipitation solvent for precipitating microparticles of the organic pigment from the organic pigment raw material liquid in a thin film fluid formed by introducing the organic pigment raw material liquid and the precipitation solvent in the space between at least two processing surfaces which are disposed so as to face each other, being capable of approaching to and separating from each other, at least one of which rotates relatively to the other; and Step 2 of coating at least a part of each of the organic pigment microparticles individually with an inorganic oxide coating, in order to suppress particle growth and/or aggregation of the precipitated organic pigment microparticles;

wherein after Step 1, Step 2 is completed at a predetermined time until the organic pigment microparticles grow and/or aggregate, and thereby particle growth and/or aggregation of the precipitated organic pigment microparticles are suppressed.

15. The method for producing organic pigment microparticles according to claim 13, wherein the predetermined time is within 1 second.

16. A method of producing organic pigment microparticles, comprising the following steps:

Step 1 of precipitating organic pigment microparticles by mixing an organic pigment raw material liquid in which an organic pigment raw material is mixed with a solvent, and a precipitation solvent for precipitating microparticles of the organic pigment from the organic pigment raw material liquid in a thin film fluid formed by introducing the organic pigment raw material liquid and the precipitation solvent in a space between at least two processing surfaces which are disposed so as to face each other, being capable of approaching to and separating from each other, at least one of which rotates relatively to the other; and Step 2 of coating at least a part of each of the organic pigment microparticles individually with an inorganic oxide coating, in order to suppress particle growth and/or aggregation of the precipitated organic pigment microparticles;

wherein Step 1 and Step 2 are performed out continuously in the thin film fluid, and after Step 1, Step 2 is completed at a predetermined time until the organic pigment microparticles grow and/or aggregate, and thereby particle growth and/or aggregation of the precipitated organic pigment microparticles are suppressed.

17. The method for producing organic pigment microparticles according to claim 16, wherein the inorganic oxide coating consists of silicon oxide.

* * * * *